(12) United States Patent
Graham et al.

(10) Patent No.: US 11,982,734 B2
(45) Date of Patent: May 14, 2024

(54) SYSTEMS AND METHODS FOR MULTI-UNIT COLLABORATION FOR NONINVASIVE DETECTION OF CONCEALED IMPERMISSIBLE OBJECTS

(71) Applicant: Lassen Peak, Inc., North Bend, WA (US)

(72) Inventors: Hatch Graham, North Bend, WA (US); Ehsan Afshari, Ann Arbor, MI (US); Karl Triebes, Kirkland, WA (US); Ryan Kearny, Kirkland, WA (US)

(*) Notice: Subject to any disclaimer, the term of this patent is extended or adjusted under 35 U.S.C. 154(b) by 416 days.

(21) Appl. No.: 17/472,156

(22) Filed: Sep. 10, 2021

(65) Prior Publication Data
US 2022/0214446 A1    Jul. 7, 2022

Related U.S. Application Data

(60) Provisional application No. 63/134,373, filed on Jan. 6, 2021.

(51) Int. Cl.
*G01S 13/88* (2006.01)
*B64C 39/02* (2023.01)
(Continued)

(52) U.S. Cl.
CPC .......... *G01S 13/887* (2013.01); *B64C 39/024* (2013.01); *G01S 7/027* (2021.05); *G01S 13/867* (2013.01); *B64U 2101/00* (2023.01)

(58) Field of Classification Search
CPC .......... G01S 13/89; G01S 13/887; G01S 7/03; G01S 13/867; G01S 13/04; G01S 7/417;
(Continued)

(56) References Cited

U.S. PATENT DOCUMENTS 6,359,582 B1    3/2002  MacAleese
6,831,590 B1 *  12/2004 Steinway ............... H01Q 1/273
                                                                342/90
(Continued)

FOREIGN PATENT DOCUMENTS

KR          102122736 B1 *  6/2020
WO       WO 2007086916 A2    2/2007
(Continued)

OTHER PUBLICATIONS

K. Statnikov, J. Grzyb, N. Sarmah, B. Heinemann and U. R. Pfeiffer, "A lens-coupled 210-270 GHz circularly polarized FMCW radar transceiver module in SiGe technology," 2015 European Microwave Conference (EU MC), Paris, France, 2015, pp. 550-553, doi: 10.1109/EuMC.2015.7345822. (Year: 2015).
(Continued)

*Primary Examiner* — Olumide Ajibade Akonai

(57) ABSTRACT

A method comprises performing, by a first coherent radar system on a chip configured to operate in a terahertz range between 0.1 THz and 1 THZ, a first radar scan of a target, the first coherent radar system being in physical contact with a first non-physical scanning device. The first non-physical scanning device then receives first scanning data from the first radar scan, and sends a coordination signal to a second non-physical scanning device. A second coherent radar system on a chip configured to operate in the terahertz range performs a second radar scan of the target, the second coherent radar system being in physical contact with the second non-physical scanning device. The second non-physical device receives second scanning data from the second radar scan, and the first and second scanning data are sent to a processor for a determination as to whether an impermissible object has been detected.

15 Claims, 11 Drawing Sheets

(51) Int. Cl.
  *B64U 101/00* (2023.01)
  *G01S 7/02* (2006.01)
  *G01S 13/86* (2006.01)
(58) Field of Classification Search
  CPC .......... G01S 7/539; G01S 13/87; G01S 7/003; G01S 17/34; G01S 7/4817; B64C 39/024; B64U 2101/00; B64U 2101/31
  See application file for complete search history.

(56) References Cited

U.S. PATENT DOCUMENTS

| | | | |
|---|---|---|---|
| 7,209,035 B2 | 4/2007 | Tabankin | |
| 7,345,279 B2 * | 3/2008 | Mueller | G01N 21/3581 250/341.1 |
| 7,920,088 B2 | 4/2011 | Thompson | |
| 7,973,704 B2 | 7/2011 | Storz | |
| 8,253,619 B2 | 8/2012 | Holbrook | |
| 8,472,884 B2 | 6/2013 | Ginsburg | |
| 8,547,274 B2 | 10/2013 | Reinpoldt, III | |
| 9,029,778 B1 | 5/2015 | Boyd | |
| 9,223,018 B2 | 12/2015 | Dayi | |
| 9,316,732 B1 * | 4/2016 | Mohamadi | G01S 13/0209 |
| 9,562,969 B2 | 2/2017 | Wang | |
| 9,575,172 B2 | 2/2017 | Charpentier | |
| 9,599,702 B1 * | 3/2017 | Bordes | G01S 13/18 |
| 9,711,851 B1 * | 7/2017 | Cesarano | G05D 1/0027 |
| 10,247,809 B2 | 4/2019 | Testar | |
| 10,754,027 B2 | 8/2020 | Dayi | |
| 10,948,587 B1 | 3/2021 | Boronse | |
| 11,550,028 B2 * | 1/2023 | Melzer | G01S 7/35 |
| 11,598,866 B2 | 3/2023 | Sleasman | |
| 11,607,151 B2 | 3/2023 | Yarkoni | |
| 2003/0162521 A1 | 8/2003 | Vorenkamp | |
| 2004/0090359 A1 | 5/2004 | McMakin | |
| 2006/0017605 A1 | 1/2006 | Lovberg | |
| 2007/0114418 A1 * | 5/2007 | Mueller | G01J 3/42 250/341.1 |
| 2008/0129581 A1 | 6/2008 | Douglass | |
| 2010/0090886 A1 | 4/2010 | Beasley | |
| 2010/0117885 A1 | 5/2010 | Holbrook | |
| 2010/0214150 A1 | 8/2010 | Lovberg | |
| 2011/0018756 A1 * | 1/2011 | Wise | G01S 13/887 342/25 A |
| 2011/0181300 A1 | 7/2011 | Bowring | |
| 2011/0304498 A1 | 12/2011 | Yanagihara et al. | |
| 2012/0081544 A1 | 4/2012 | Wee | |
| 2012/0293355 A1 | 11/2012 | Marianer et al. | |
| 2013/0033574 A1 | 2/2013 | Kuznetsov | |
| 2013/0207830 A1 | 8/2013 | Watts et al. | |
| 2014/0144009 A1 | 5/2014 | Chattopadhyay | |
| 2015/0285907 A1 | 10/2015 | Mohamadi | |
| 2015/0293221 A1 | 10/2015 | Ahmed | |
| 2016/0109568 A1 * | 4/2016 | Aoyagi | G01S 13/878 342/59 |
| 2016/0116581 A1 | 4/2016 | Mohamadi | |
| 2016/0223669 A1 | 8/2016 | Assefzadeh | |
| 2016/0291148 A1 | 10/2016 | Ellenbogen | |
| 2016/0359569 A1 * | 12/2016 | Dailey | G02F 1/39 |
| 2017/0031004 A1 | 2/2017 | Jales | |
| 2017/0038467 A1 | 2/2017 | Levita | |
| 2018/0217249 A1 | 8/2018 | La Salla et al. | |
| 2019/0293833 A1 | 9/2019 | Chen | |
| 2020/0064996 A1 | 2/2020 | Giusti | |
| 2020/0249341 A1 * | 8/2020 | Valdes Garcia | G01C 11/02 |
| 2020/0311899 A1 | 10/2020 | Piette | |
| 2020/0326416 A1 | 10/2020 | Albasha et al. | |
| 2020/0341493 A1 | 10/2020 | Sabato | |
| 2020/0389624 A1 | 12/2020 | Oberholzer | |
| 2020/0408899 A1 | 12/2020 | Nanzer | |
| 2021/0278526 A1 | 9/2021 | Pedross-Engel | |
| 2022/0066065 A1 | 3/2022 | Zhao | |
| 2022/0179062 A1 | 6/2022 | Amir | |
| 2022/0221576 A1 | 7/2022 | Zhao | |
| 2022/0365205 A1 | 11/2022 | Gal | |
| 2022/0390590 A1 | 12/2022 | Marchese | |

FOREIGN PATENT DOCUMENTS

| | | | |
|---|---|---|---|
| WO | WO 2009067627 A1 | 5/2009 | |
| WO | WO 2009131806 A1 | 10/2009 | |
| WO | WO-2020124026 A1 * | 6/2020 | G06F 16/285 |

OTHER PUBLICATIONS

J. Grzyb, K. Statnikov, N. Sarmah, B. Heinemann and U. R. Pfeiffer, "A 210-270-GHz Circularly Polarized FMCW Radar With a Single-Lens-Coupled SiGe HBT Chip," in IEEE Transactions on Terahertz Science and Technology, vol. 6, No. 6, pp. 771-783, Nov. 2016, doi: 10.1109/TTHZ.2016.2602539. (Year: 2016).

P. Hillger, J. Grzyb, R. Jain and U. R. Pfeiffer, "Terahertz Imaging and Sensing Applications With Silicon-Based Technologies," in IEEE Transactions on Terahertz Science and Technology, vol. 9, No. 1, pp. 1-19, Jan. 2019, doi: 10.1109/TTHZ.2018.2884852. (Year: 2019).

A. J. Seeds et al., "Coherent terahertz systems," 2012 IEEE International Topical Meeting on Microwave Photonics, Noordwijk, Netherlands, 2012, pp. 278-281, doi: 10.1109/MWP.2012.6474112.

* cited by examiner

SYSTEMS AND METHODS FOR MULTI-UNIT COLLABORATION FOR NONINVASIVE DETECTION OF CONCEALED IMPERMISSIBLE OBJECTS

CROSS REFERENCE TO RELATED APPLICATIONS

This application claims priority to U.S. Provisional Patent Application No. 63/134,373, filed on Jan. 6, 2021, and entitled "Systems and Methods for Multi-Unit Collaboration for Noninvasive Detection of Concealed Impermissible Objects," the contents of which are hereby incorporated by reference in their entirety.

BACKGROUND

In 1968, the Supreme Court issued its landmark decision in the case of Terry v. Ohio, in which the Court held that the U.S. Constitution's prohibition on unreasonable search and seizure of citizens is not violated when a police officer searches a citizen under the circumstances that the police officer has a reasonable suspicion that a citizen is committing, or is about to commit, a crime, and the police officer has a reasonable belief that the citizen may be armed and dangerous. As the Court stated, "[w]hen an officer is justified in believing that the individual whose suspicious behavior he is investigating at close range is armed and presently dangerous to the officer or others, it would appear to be clearly unreasonable to deny the officer the power to take necessary measures to determine whether the person is, in fact, carrying a weapon and to neutralize the threat of physical harm."

The ruling in the Terry case has led to the widespread use of so-called stop-and-frisk practices by police departments throughout the country, also called "Terry Frisks." The legal boundaries of a Terry, however, are always in question, and have led to claims of racial profiling. In addition, because of the physical nature of a Terry Frisk, a police officer frisking a person must be close enough to actually touch the person, leading to increased danger to the police officer. Thus, in a Terry Frisk, both the public and the police suffer. The subjects of the search tend to become infuriated by the physical contact and the limits to their freedom, and the police officer performing the frisk is put in peril because of their close proximity to a now-infuriated suspect. In addition, the Terry Frisk is prone to error, with police officers often missing the existence of weapons.

In addition to the Terry Frisk, which is a non-consensual interaction between the police and a subject, the public is regularly subjected to a variety of consensual stops and searches. A consensual search is a search in which an individual either implicitly or explicitly gives consent for a search to be conducted as a condition for something else, like entry into a sporting venue, or prior to boarding an airplane. Unlike the Terry Frisk, a consensual search is not considered a detention as the individual is free to leave at any time or can refuse to answer questions. Although law enforcement occasionally uses consensual search when permission is granted by a subject who is not yet a suspect, the more common and pervasive use case of consensual searches is to prevent unwanted items such as guns or alcohol from being brought into buildings, schools, sporting or other events, airports, voting facilities, court rooms, and other venues.

For example, when entering a sports arena, attendees are typically asked to consent to a combination of being scanned (e.g., by a metal detector) and being physically pat down as the hired security searches for improper items such as bottles of alcohol or weapons. This process is slow, error prone, cumbersome, and requires expensive manpower and equipment, all of which ultimately lead to a poor customer experience for the attendee.

Many of these venues are temporary (in non-permanent and dedicated facilities) requiring security be set up before the event and removed after the event. These events include festivals, religious events, polling and election events, concerts, and other temporary events. Security for these venues is of the highest priority for the event promoters and venue owners. Violence, riots, fights, or other problems can result in an impact in future ticket sales leading to significant reduction in revenue and potential litigation.

Airports are an area of particular concern. Security at airports can include expensive equipment like millimeter wave scanners and backscatter x-ray scanners. The millimeter wave scanner is a large, fixed, device sized and configured to allow a passenger to stand inside, with feet apart and hands over their head, while the device creates a full-body scan that is reviewed by a TSA agent. Backscatter x-ray scanners subject users to mutagenic x rays and can produce revealing full-body images of passengers that are embarrassingly and unnecessarily obtrusive, and need to be reviewed by a TSA agent.

The common factors in all of these devices that they exhibit one or more of the following traits: they can be expensive, bulky, slow, and often times dangerous in what they may not detect. Thus, a need exists for a handheld, portable, low-cost device that provides for contactless, non-intrusive, and accurate scanning for weapons or other banned objects, and that does not harm the subject.

SUMMARY

Embodiments of the present invention involve breakthrough innovations to revolutionize how both Terry frisks and consensual searches are conducted. Embodiments include imaging systems that are portable, hand-held, and high-resolution methods and devices that are capable of detecting objects hidden under, for example, people's clothing, or within a bag, or elsewhere. Using embodiments of the present invention, a user can safely conduct a weapons search without being in physical contact with the subject being searched.

Embodiments of the present invention involve systems and methods of coordinating multiple THz band (from approximately 0.1 to approximately 1.0 THz) portable, handheld, body worn, or drone mounted weapons detection systems to provide in-theatre instantaneous threat Information derived from weapon detections, geo-location data, visual images, and other real time situational data.

Embodiments of the present invention use the novel approach to implement previously bulky and expensive devices on a single chip implementation used to provide the scanning and imaging functions in the LP. Embodiments of these innovations include components such as a low noise, high bandwidth Voltage Controlled Oscillator (VCO) to attain a center frequency exceeding 200 MHz, a coherent mixer that improves receive sensitivity by 1000× over existing solution, and a full on-chip multi-element scanner that eliminates the need for external antennas or element arrays. Furthermore, embodiments include process innovations allowing these chips to include low-cost 28 nm CMOS or SiGe semiconductors, or other readily available processes.

Embodiments of the invention include a method or methods for concealed-object detection using one or more handheld, portable, battery operated, electromagnetic scanning apparatuses configured to operate at distance of up to roughly 25 feet or more. In an embodiment, the operator conducting the object search positions the subject to be scanned at a distance of up to approximately six to ten feet (or more) from the apparatus and initiates the scan. The apparatus emits non-visible electromagnetic radiation in the frequency band between approximately 0.1 to 1 THz as part of the scanning process. In an embodiment, the apparatus employs a phased array antenna in conjunction with a voltage controlled oscillator (VCO) to steer the emitted beam both vertically and horizontally to transmit electromagnetic radiation and deterministically illuminate the subject of the scan. Reflected electromagnetic radiation is received by an antenna on the apparatus and coherently mixed with the transmitted signal, allowing differential phase and amplitude information to be recovered. In an embodiment, the received signal is converted from time domain to frequency domain creating data that is used to produce an image. In an embodiment, the resultant image is further processed using a pattern matching algorithm (or a combination of algorithms) to identify objects within the field of view of the apparatus. The objects can be compared against a database of known objects and the operator is alerted in the case of a match.

In an embodiment, the apparatus is configured to show only suspicious objects on a representation of a subject's body, and not to provide any images of the subject's actual body. In an embodiment, the apparatus is configured to provide a visual representation of a suspicious object. In an embodiment, the apparatus is configured to display where on a subject's body the suspicious object can be found. In an embodiment, the apparatus is configured to provide an audible, visible, or mechanical warning that a suspicious object exists, thus allowing allow the searcher to keep their hands free during the scan. In an embodiment, the apparatus is used in a handheld mode. In an embodiment, the apparatus is used in a hands-free mode, and can be attached to the searcher's clothing or hung from the searcher's body, or attached to the searcher's equipment, or mounted in a handheld mechanism. In an embodiment, the apparatus can be attached to airborne or terrestrial vehicles, such as, but not limited to drones, automobiles, or robotic systems. In an embodiment, the apparatus can be used in conjunction with, or as part of, a body-worn camera. In an embodiment, the apparatus can be configured to be in communication with a network, and can upload both scanned data and metadata related to the scanned data, to a cloud-based or network-based system for further analysis and storage.

Embodiments of the invention can further include a method or methods for concealed-object detection using one or more aerial, drone-mounted, or other vehicle-mounted, battery operated, electromagnetic scanning apparatuses configured to operate from a distance of up to roughly 25 feet from the target.

In an embodiment, an operator or user can manually control aspects of the policy setting and the scanning. In an embodiment, the scanning can be fully autonomous, with policies preprogrammed into the system to allow for target selection, scanning, analysis, and storage, performed without user or operator interference. In an embodiment, the process can be partially autonomous, with an operator interacting with the system, which can include interacting with the drone (or drones), the camera, or the scanner, as needed for target selection, scanning, analysis, and storage.

In an embodiment, the operator can select a policy that can then execute a set of pre-programmed instructions associated with the specific policy. In an embodiment, the policy can be preselected, or automatically selected based on inputs from the operator. In an embodiment, policies can be represented as a set of programming primitives accessible through a known RESTful API interface. For example, the primitives can represent a collection of instructions to command the drone and/or the Non-physical search device ("NPSD") actions, send and receive status messages, send and receive position data, an any other policy as necessary or required for the operation's functionality. In an embodiment, policies can conditionally execute instructions based on events. For example, a set of instruction could tell the drone to fly to a specific set of coordinates, activate the radar to get an indication of range from the target, and then using this new information, derive a new set of coordinates representing the next location to which the drone can fly, and then fly to that next location. These instructions may be repeated until the policy for target distance is satisfied, and on that event, the device can then initiate an imaging radar scan of the target.

In addition to object detection, in embodiments, the apparatus can be configured to provide an image of a scanned subject's facial features even where the subject is wearing a mask or other clothing or covering. The resultant images can be subsequently used to determine the subject's identity either visually or through the use of a facial recognition system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

One or more of the systems and methods described herein describe a way of providing a system and method for noninvasive searches. As used in this specification, the singular forms "a" "an" and "the" include plural referents unless the context clearly dictates otherwise. Thus, for example, the term "a computer server" or "server" is intended to mean a single computer server or a combination of computer servers. Likewise, "a processor," or any other computer-related component recited, is intended to mean one or more of that component, or a combination thereof.

Figure 1:
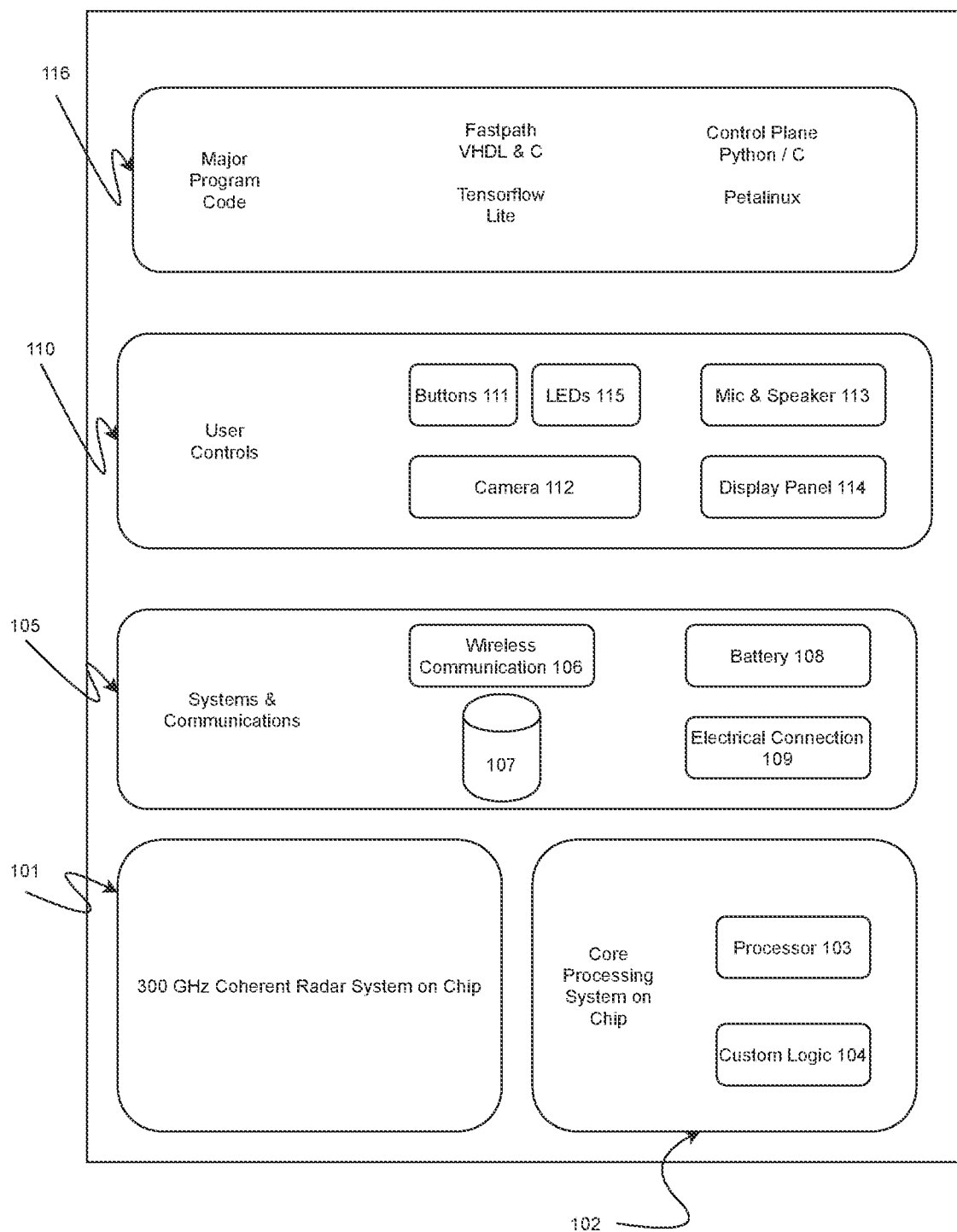
FIG. 1 is a block diagram of a system for providing a noninvasive imaging and detection system, according to an embodiment of the invention.

FIG. 1 is a block diagram of a system for providing a system for noninvasive imaging and detection. In an embodiment, the system comprises a coherent radar system on a chip 101, in communication with a core processing system 102. The core processing system 102 includes a processor 103 and custom logic 104.

The coherent radar system on a chip is configured to provide both range resolution and lateral resolution that is orders of magnitude greater than is found in the prior art. For a single radar chirp emitted by the chip, range resolution, which refers to the quantifiable distance to an object, is directly related to the bandwidth ($f_{max}$-$f_{min}$), where the available bandwidth is typically 5%-15% of the transmitted center frequency. Thus, the higher the center frequency, the higher the available bandwidth, and so the higher the ranging resolution. Because the chip is designed to operate in the terahertz (THz) range, the ranging resolution may be used to distinguish distances in the sub-millimeter range.

Lateral resolution, on the other hand, relates to the quantifiable distance between samples of perpendicular cross section (e.g., side to side and top to bottom). In other words, lateral resolution relates to feature resolution of a scan. As the transmitted signal is swept across the target (i.e., the target is scanned), the resultant received signed is processed to show variations in reflectivity from the scanned target. These variations can be processed by using standard techniques such as, but not limited to, a Fast Fourier Transform (FFT) to produce an image. The feature size, or resolution of the image, is directly proportional to the wavelength of the emitted source where the shorter wavelength provides increased resolution. Another way to describe this is to say lateral resolution is a function of both beamwidth and steering. Beamwidth is a function of wavelength divided by antenna dimension. As the frequency of the beam increases, its wavelength decreases, and hence, the beamwidth decreases. In addition, the more antenna elements found on the chip, the larger the dimension, and thus the tighter the beamwidth. The tighter the beamwidth, the higher the resolution of distinguishing cross-sectional differences. Thus, in the THz range where the chip operates, the device can provide sub millimeter lateral resolution. Coherence is used to achieve high receiver sensitivity, and allows for recovery of the difference of frequency between transmit and source. This high receiver sensitivity is used to obviate the need for transmitting a signal on the order of >1,000× or 30 dB higher in power, which would not allow for a single chip implementation of the radar.

In an embodiment, core processing system 102 includes processor 103 and custom logic 104. Processor 103 is configured to process instructions to render or display images, initiate a scan, process the results of a scan, alert the user, and provide the results of an object match, if any, to the user. Processor 103 can be any of a variety and combination of processors, and can be distributed among various types and pieces of hardware found on the apparatus, or can include hardware distributed across a network. Processor 103 can be an ARM (or other RISC-based) processor. Additionally, such processors can be implemented, for example, as hardware modules such as embedded microprocessors, Application Specific Integrated Circuits ("ASICs"), and Programmable Logic Devices, including flash memory ("PLDs). Some such processors can have multiple instruction executing units or cores. Such processors can also be implemented as one or more software modules in programming languages as Java, C++, C, assembly, a hardware description language, or any other suitable programming language. A processor according to some embodiments includes media and program code (which also can be referred to as code) specially designed and constructed for the specific purpose or purposes. Custom logic 104 can include one or more Field Programmable Gate Array(s) (FPGA) or any type of PLD for custom logic to support processing offload from Processor 103.

In communication with coherent radar system 101 and core processing system 102, are the systems and communications circuits 105, comprising wireless communications circuits 106, memory 107, power source 108, and an external electrical connection 109.

Wireless communications circuits 106 can include any practicable wireless communications circuits including, but not limited to, a wireless fidelity ("Wi-Fi") or wireless local area network ("WLAN") connection, a wireless wide area network ("WWAN") connection, a Bluetooth connection, an LTE/5G connection, and/or a cellular connection.

Memory 107 can be used to store, in computer code, artificial intelligence ("AI") instructions, a catalog of images, device configuration, an allowable, calculated, or predetermined user workflow, conditions for altering, device status, device and scanning configuration, and other metadata resulting from the scanning process. Memory 107 can be a read-only memory ("ROM"); a random-access memory (RAM) such as, for example, a magnetic disk drive, and/or solid-state RAM such as static RAM ("SRAM) or dynamic RAM ("DRAM), and/or FLASH memory or a solid-data disk ("SSD"), or a magnetic, or any known type of memory. In some embodiments, a memory can be a combination of memories. For example, a memory can include a DRAM cache coupled to a magnetic disk drive and an SSD. Memory 107 can also include processor-readable media such as magnetic storage media such as hard disks, floppy disks, and magnetic tape; optical storage media such as Compact Disc/Digital Video Discs ("CD/DVDs), Compact Disc-Read Only Memories ("CD-ROMs), and holographic devices: magneto-optical storage media such as floptical disks; Solid state memory such as SSDs and FLASH memory; and ROM and RAM devices and chips.

Power source 108 can include any type of practicable battery, including but not limited to, Lithium-ion, Nickel Cadmium, Nickel-Metal Hydride, and alkaline. Power source 108 can comprise an external power source coupled to circuitry internal to the device. USB connection 109 can be used to put the apparatus in communication with a network, or can be used to provide an electrical connection to charge or power the apparatus.

In an embodiment, the apparatus further includes User Controls 110. User Controls 110 include user buttons 111 to manipulate the apparatus to turn the device on and off, to set the resolution, configure the device, or select a preconfigured setting, initiate a scan, initiate a connection with the cloud based service via one of the network interface (e.g., Wi-Fi, cellular, Bluetooth, or any other practicable interface) and control the camera functions. LEDs 115 can be used to provide feedback and information to the user about the state of the device, or about the results of a scan. Camera 112 is configured to capture optical images, and a microphone and speaker 113 are configured to facilitate communication, including communication to third parties, or communication with the device through voice or audio commands, and for the device to provide sound to the user such as one or more alarms or notifications. Display panel 114 can be an LCD or other type of display panel configured to display messages to the user, or to provide images representing the results of a scan.

In an embodiment, the apparatus comprises major program-code components 116 used to operate and control the device, which can include the computer instructions executed by the apparatus in performing a scan, and other functions of the apparatus. Program-code components 116 can include, but are not limited to, micro-code or micro-instructions, machine instructions (such as produced by a compiler), and files containing higher-level instructions that are executed by a computer using an interpreter. Program code can include hardware, software, firmware, and any practical way of coding. For example, an embodiment may be implemented using HTML, Java, C++, or other object-oriented programming language and development tools. Additional examples of program code include, but are not limited to, control signals, encrypted code, and compressed code. Major program code can include, but is not limited to, a standard operating system (e.g., Linux), hardware drivers for software-managed hardware elements, machine-learning inferencing, image processing, image storage and retention, cloud-service interface, scanning process, user interface, device management, cryptographic functions, user access management, and device health.

Figure 5:
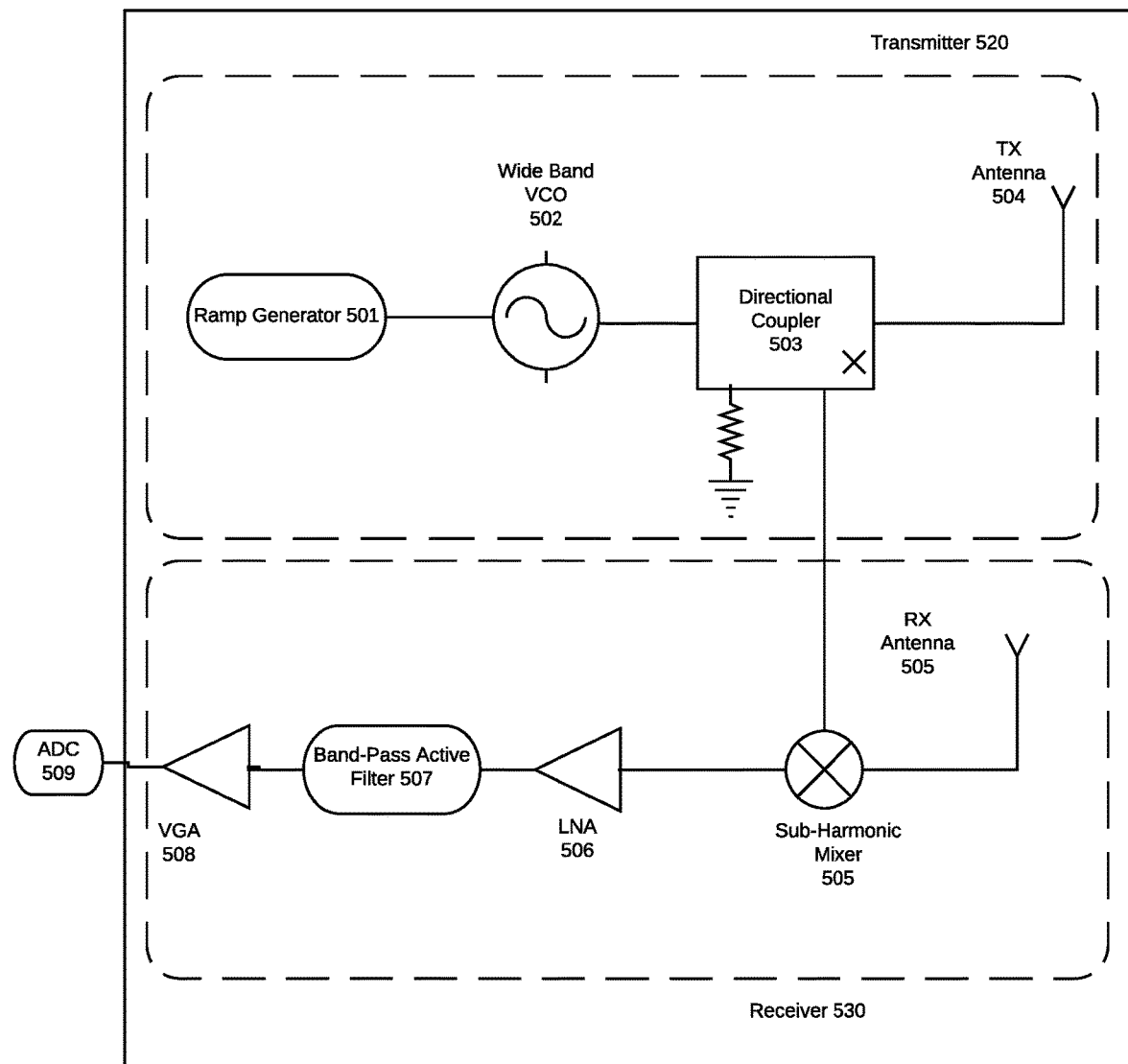
FIG. 5 is a block diagram of a schematic for a radar system on a chip (RSOC), according to an embodiment of the invention.

FIG. 5 is a block diagram for a schematic of a radar system on a chip (RSOC) used in an apparatus, according to the present invention. Notwithstanding anything else in the application, one skilled in the art will understand that the RSOC includes all the elements described with regard to FIG. 5 on a single chip (with the exception of ADC 509, addressed below). Generally, the RSOC transmits the RF signals via TX antenna 504, and receives the reflected signal via RX antenna 505, to produce a baseband analog signal that is digitized by an external analog-to-digital converter (ADC 509) and processed by digital processing logic and a CPU to product a visible image of the scanned target. The RSOC consists of two major functions; 1) A transmitter that produces the radar signal and initiates the scan and 2) a receiver that receives the reflected signal and recovers differential phase and frequency information, and provides that information to the digital processing system.

In an embodiment, Transmitter 520 consists of 4 major functional components: Ramp Generator 501, Wide-Band Voltage Controlled Oscillator (VCO) 502, Directional coupler 503, and a Phased-array element array 504. Ramp generator 501 is configured to provide a voltage signal to Wide Band VCO 502, which controls the center frequency of the VCO nominally centered between approximately 0.1 to 1 THz. Ramp Generator 501 is configured to move the center frequency of Wide Band VCO 502 over a predetermined frequency that creates a frequency sweeping action to produce the radar scan. Ramp Generator 501 can generally produce a sawtooth voltage waveform, however, other waveforms such as ramp, sinusoid, flat, or combinations thereof, may be employed as well. The Wide Band VCO 502 can be is implemented to produce low phase noise, thus improving the receiver's receiver sensitivity. The signal from Wide Band VCO 502 can then be provided to Directional Coupler 503, which can create at least two coherently related identical versions of the input signal. One of the two versions of the input signal is provided to the sub-harmonic mixer as a coherent reference, and the other version of the input signal is provided to the phased array element antenna. Each element in the system acts as an antenna and employs a phase-locked oscillator coherently related to the signal from Wide Band VCO 502 to ensure a fixed phase relationship from adjacent transmitting elements, which can be used for, for example, to attenuate unwanted sidelobes. The RF energy produced by the elements is focused using an external radar lens (not shown), generally implemented as a hemispherical component of radar transmissive material, to scan the target and create the reflected RF energy to be received by Receiver 530.

Receiver 530 consists of 5 major functional elements: 1) Receive Antenna (RX Antenna) 504; 2) Sub Harmonic Mixer 505; 3) Low Noise Amplifier (LNA) 506; 4) Band Pass Active Filter 507; and 5) Variable Gain Amplifier (VGA) 508. Receive Antenna 505 is configured to receive the reflected RF signal broadcast by the transmitter and reflected from the target. RX Antenna 504 may be implemented as a dipole antenna, or by any other practicable antenna configuration. The signal received at RX antenna is provided to the sub-harmonic mixer, which can then create sum and difference frequencies based on the reference signal provided by the transmitter. The sum and difference frequencies are coherently related, and enable the receiver to recover differential phase and frequency, thus improving the noise figure of the receiver by approximately 10,000× (or 40 dB) as compared to traditional non-coherent receivers. LNA 506 is used to amplify the signal as required by Band Pass Active Filter 507. Band Pass Active Filter 507 filters off undesirable harmonics created by the Sub-Harmonic Mixer 505. The term 'active' refers to the use of active elements to include linearly biased transistors in conjunction with reactive and passive elements to provide the bandpass filter with minimized or reduced noise and phase distortions of the passed signal. VGA 508 receives the signal from band-pass filter and amplifies and provides the necessary impedance matching for external ADC 509. In an embodiment, ADC 509 is implemented functionally on the RSOC. In an embodiment, ADC 509 is implemented external to the RSOC.

Figure 2:
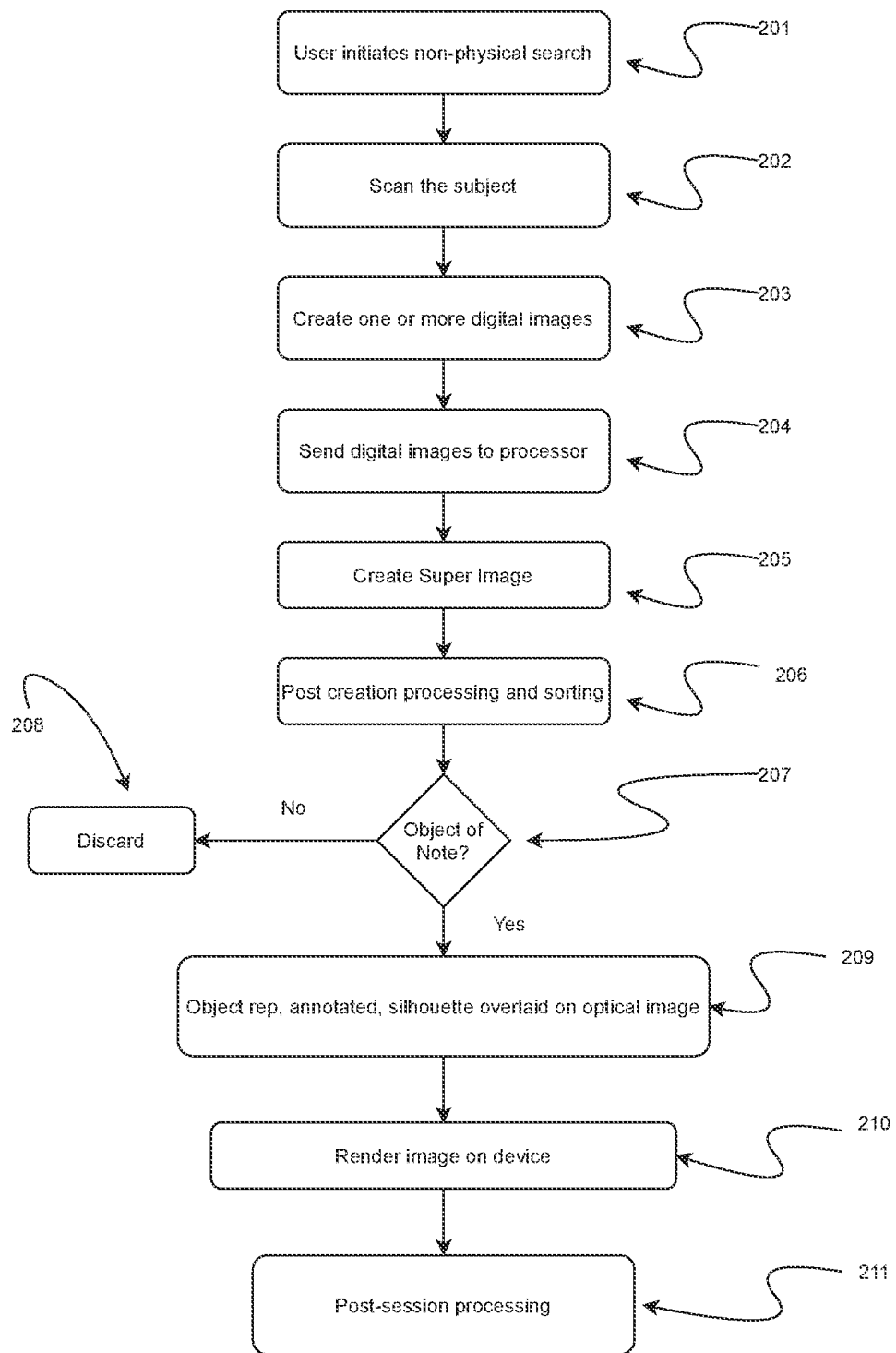
FIG. 2 is a flow chart of a process for noninvasive concealed-object detection, according to an embodiment of the invention.

FIG. 2 is a flow chart of a method for using a non-invasive scanner for creating images useful for imaging and detection. Prior to use, in an embodiment, the apparatus will have, and will be in, one of a set of operational modes and or states, including a low-power or standby mode, a synching mode, and an off mode. A user can generally tell, based on the apparatus's display, whether the apparatus is in an operational mode or not. In an embodiment, the apparatus will be able to show the local user which state the apparatus is in, via LEDs, local LCD panel, or using an audible warning. If the apparatus is in an off mode, then the apparatus is powered off and does not perform any scanning. In an embodiment, the apparatus can be in a state that requires user interaction to set up the apparatus in sync mode and connect it to an online network for backup and additional functionality such as uploading data and metadata. In an embodiment, the apparatus can be set to sync automatically through the online network.

In sync mode, the apparatus can send and receive operational control parameters such as a cryptographic device key for device or user login to the system, user-configuration data detailing, for example, who is using the apparatus, what organization or department the user belongs to, updates to the machine-language inferencing engine, relevant (e.g., user or departmental) policies and controls, including general policies on alert, event, and trigger actions. In addition, the operational control parameters can include information detailing how full the device disk is, and whether upload is required. In an embodiment, the machine-language inferencing engine is the process that performs the object pattern matching and subsequent identification. In an embodiment, it can be implemented in software and accelerated using and FPGA. In an embodiment, it can be implemented in hardware. In an embodiment, it can be implemented in any practicable combination of hardware and software.

In the low power or standby mode, in an embodiment, the apparatus is operational and ready for use. In an embodiment, network access exists, along with a live connection to any related network services. In another embodiment, no network access exists. The apparatus can include sufficient local storage and processing power for operating independent of a network. The apparatus can further include a timer along with a device key to allow a user to use the apparatus as long as the timer has not timed out, thus ending the user session on the apparatus.

In embodiments, other modes that can be used by the apparatus include active-target-acquisition mode, and active-non-physical-search-in-process mode. In active-target-acquisition mode, the apparatus will show or relate the field of view to the user with an active camera and preparing to go to state 5. State 5 defines the system being in the active state of a non-physical search. In this state, the apparatus imaging system pipeline and real-time alerts and notifications are active.

In an embodiment, if the device is ready for use, then at 201, the user initiates a non-physical search of a subject. In an embodiment, the initiation of the non-physical search can begin with a user setting up a subject between 5 and 10 feet away from the apparatus. The subject can then be asked to look at the user and/or the apparatus. The user can then point the apparatus toward the subject and turn on the scanning function of the device via a button, trigger, voice control, or other control switch.

At 202, in an embodiment, the apparatus scans the subject. To do this, in an embodiment, the radar system on a chip generates a radar signal and sweeps a predetermined field of view, emitting a radar signal in the 0.1 to 1 THz range. The apparatus employs a phased array antenna in conjunction with a voltage controlled oscillator (VCO) to steer the emitted beam to transmit electromagnetic radiation and deterministically illuminate the subject of the scan, according to an embodiment. To complete the scan, the emitted signal interacts with the subject, and a certain amount of the electromagnetic radiation is reflected back and received by an antenna on the apparatus. The received signal is coherently mixed with the transmitted signal allowing differential phase and amplitude information to be recovered. In an embodiment, the transmit signal is combined, or mixed, with the returning signal allowing for recovery of frequency and phase information in the receive signal.

At 203, in an embodiment, the analog signal from the scan is converted to a digital format using one or more analog-to-digital converters (ADCs) to create a digital image that can be forwarded to the processing complex of the apparatus. In an embodiment, the process of scanning and creating an image can be repeated a predetermined number of times (programmed into the apparatus or selected by the user) creating multiple digital images.

At 204, in an embodiment, the multiple images are sent to the processor, and in 205, the multiple images are combined in the processor to form a super image to enhance resolution, creating a super image. The steps of this super imaging process are detailed in FIG. 3, discussed below. At 205, the feature resolution of the image is enhanced, thus improving the chances for object recognition in 206.

Once the post creation processing and sorting has been performed at 206, a determination is made at 207 as to whether an object of note is found. If an object of note is not found, the image and its corresponding data can be discarded. If an object of note is found, then at 209, the object of note is superimposed as an outline over an outline of the scanned target, and at 210, the final image is presented to the user. The image can be rendered on a screen on the device. Optionally, the image can be rendered on a smartphone or other handheld mobile device, or any practicable portable device. When rendered or displayed, the image can contain the original visual image of the target with representations of objects found. The multiple images can also be combined to create a video stream. And because the scanning process provides ranging information, the device can provide a three-dimensional rendering of the image. In an embodiment, different colors are used to indicate the threat level of the detected object. As an example (but not the only example), a red outline displayed on the apparatus can indicate the presence and position of a gun. As another example (but not the only example), a green outline can be used to indicate the presence of keys, or some other equally innocuous object.

In an embodiment, an image of an identified object, or a representation thereof, can be superimposed of a representation of the scanned target. In an embodiment, the representation can be an outline of the scanned target, e.g., a generic outline of a human form, over which the image representing the identified object can be placed, providing the user with information about the positioning of the object on the subject's body, in addition to detailing the threat level of the object. In an embodiment, the representation of the scanned target can take the form of a variety of zones displayed on a screen positioned on the apparatus, or on a mobile device in communication with the apparatus.

Upon completion of a search, at 211, post-session processing takes place. This processing can include all or some of the following: tagging images or videos with metadata, gathering and uploading metadata, generating a report, providing a digital signature or certificate, archiving, and uploading the data (both received and processed) and metadata. In this step, images can be cryptographically tagged with various metadata and transmitted and stored on the device, or can be uploaded for further processing. If a data repository is used (e.g., a cloud-based database or an online server), the images, videos, and metadata can be stored there. Examples of metadata can include (but are not limited to) time stamps, geolocation data, device data, customer specific information (user, associated visual images), networked or connected devices, voice recordings, and session information. In an embodiment, a web-based service can be implements using public cloud infrastructure and services such as those provided by (but not limited to) AWS, Azure, and GCP.

Figure 3:
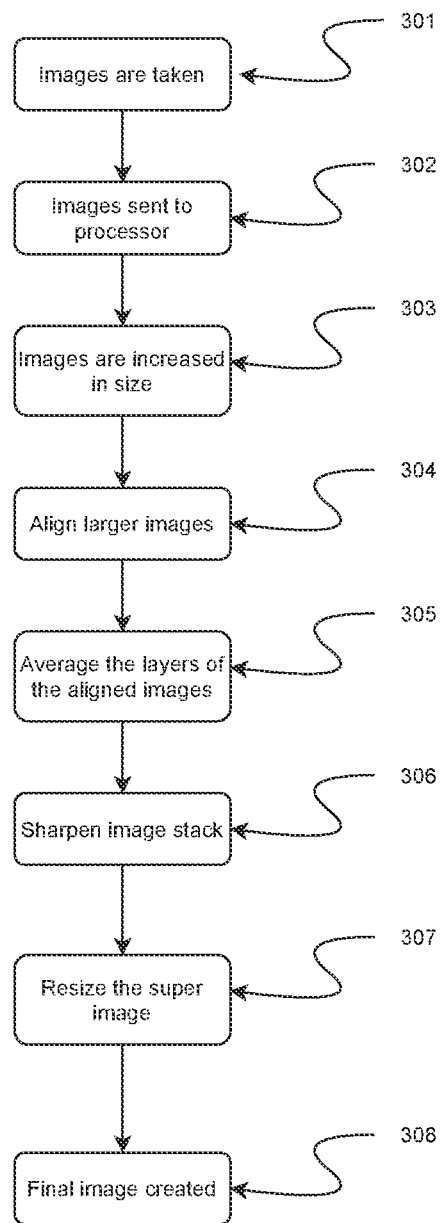
FIG. 3 is a flowchart of a method for creating a dataset from images taken by a non-invasive scanner, the dataset being appropriate for post processing and use in imaging and detection, according to an embodiment of the invention.

FIG. 3 is a flowchart of a method for creating a dataset of images to be used for imaging and detection, according to an embodiment. At 301, one or more images are taken. At 302, the images are sent to a processor for processing. The image or images received at the processor are in increased in size by a predetermined amount creating a set of larger images, at 303. In an embodiment, the images are increased in size to achieve finer blending of the image stack in order to extract the high frequency data that is embedded in the low frequency data hidden in the aliasing.

At 304, at least a subset of images in the set of larger images are aligned, according to an embodiment. In an embodiment, at 305, the layers are averaged with linear opacity 1, 0.5, 0.25, 0.125, and so on, allowing images, in an embodiment, to be blended evenly, making use of the aliasing.

At 306, in an embodiment, the image stack, the plurality of images being combined, is sharpened using a predetermined radius. At 307, according to an embodiment, the final super image is resized. One skilled in the art will understand that the output can be resized to any desirable size using any practicable resampling method that provides an appropriate image. At 308, the super image is used to create the final image (seen in 206 from FIG. 2). Once the super image is created, the image is further processed, as detailed in FIG. 4, discussed below.

Figure 4:
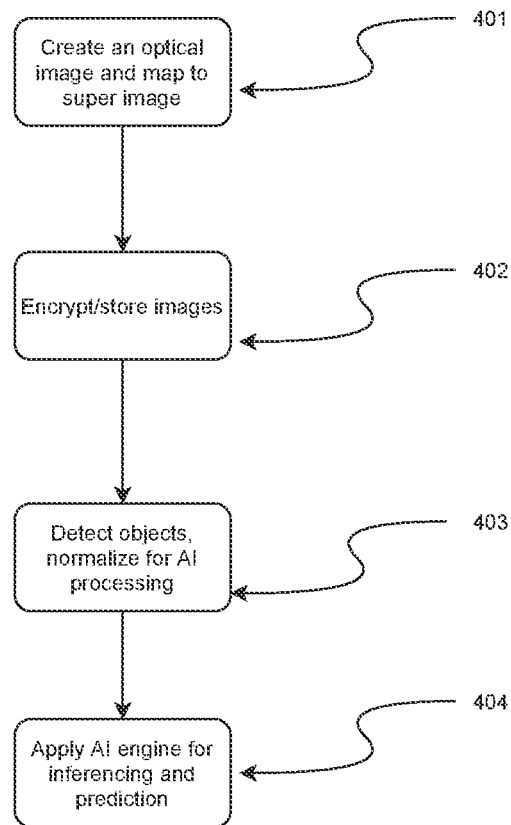
FIG. 4 is a flowchart of a method for processing a final image, according to an embodiment of the invention.

FIG. 4 is a flow chart of a method for processing the existing data to create a final image. At 401, an optical image is created and mapped to the super image creating a filtered image. In an embodiment, the apparatus uses a separate camera to create an optical image used as a base image configured to be mapped to the super image, according to an embodiment. In an embodiment, the separate camera is a digital camera using a CCD sensor, or a CMOS sensor, or any practicable sensor.

At 402, in an embodiment, the filtered images are encrypted, while the unfiltered image data is discarded. One skilled in the art will understand that the encryption can be performed using SSL or TLS secure encryption, or any practicable encryption. In an embodiment, the apparatus stores some or all of the filtered image locally. In an embodiment, the apparatus stores some or all of the filtered image in a backend cloud service where it can be archived or undergo additional processing, or both.

At 403, in an embodiment, the super image is analyzed to determine whether any objects of note are present on the subject, and if so, the super image is normalized for processing. In an embodiment, normalizing the super image means preprocessing it into a format, or with information, appropriate to feed an artificial intelligence system. This preprocessing can include (but is not limited to) scaling to a fixed width and height, conversion of the bit depth, shifting and or rotation of image. The processing can be performed by an artificial intelligence (AI) system.

At 404, once the objects have been normalized, the resultant image is transferred to an AI engine for pattern matching against known threats and then calculating the likelihood that the input data is a threat. As part of the image processing, in an embodiment, the apparatus performs an image search to match detected shapes against a prebuilt local image threat library, or a mathematical model representing such images, and makes a threat determination using parameters such as shape type, size, type of weapon, confidence level, contrast, and other parameters. Entries in the threat library can include some or all of the following: guns, knives, bombs and bomb vests, clubs, truncheons, bottles, and other objects of interest. In an embodiment, once a preliminary determination has been made that a weapon is suspected, the apparatus will focus in on the suspected weapon(s) and providing better image resolution to improving the detection confidence. In an embodiment, privacy filtering processing is applied, thus ensuring all locally storage body images are obfuscated as part of the image processing described in FIG. 3.

In an embodiment, the polices and control of the apparatus, the chip, and the general system, can be configured and controlled by a hierarchical set of domains allowing for different domains to grant configuration control to subordinate domains. In an embodiment, the policy and configuration control can be separated from the users of the device to ensure compliance, operational procedures, and in general simplicity of use. In an embodiment, the policy and configuration control can be performed and input by a local user. In an embodiment, the policy and configuration control and be performed and input using an AI system.

Users can configure policies and alerts for different actions, and to provide feedback in different forms. In an embodiment, alerts can be visual (e.g., providing an outline of an object on a screen). In an embodiment, alerts can be audible (e.g., emitted by a device speaker or through an ear-piece). In an embodiment, alerts can trigger or prompt a user for additional actions of a remote device (e.g., via call to API), or other user defined actions.

In general, an event that triggers a display or alert of an unwanted object (as examples) can combined with, and work with, other events using, for example, Boolean logic to form complex triggers. Examples of triggers can include: More than two unidentified objects were found that were larger than a predetermined size. Events can include but are not limited to: an object is identified via machine learning with a predetermined probability; a person is identified via facial recognition, within a predetermined probability; an object of size greater than a predetermined size is found but not identified; an object of size smaller than a predetermined size is found but not identified; a search took place at a certain time of day, or within a certain range of times; and/or whether a contactless Terry Frisk is required; and any other event that can trigger an action.

Examples of alerts and controls can include: logging an event locally or in the cloud; logging an event in the cloud in either real time or in a batch upload; alerting a user with local audio, vibration, light or local display; alerting a user via a headset, earbuds, glasses, or any other remote device; texting to one or more mobile phone numbers or sending an alert to a mobile app; emailing an alert to one or more email addresses; providing a suggestion to a user on what a next step is for them to take, in addition to the alert itself; communicating to other contactless search devices as a remotely generated event; and calling a custom remote API, which can prompt some other action such as unlocking or locking a door, turning lights on or off, or any other customer-defined action.

One skilled in the art will understand, in the context of embodiments of the invention, that the term "a combination of" includes zero, one, or more, of each item in the list of items to be combined.

For the purposes of the present invention, the term computer program or computer code includes software, firmware, middleware, and any code in any computer language in any configuration, including any set of instructions or data intended for, and ultimately understandable by, a computing device.

One skilled in the art will understand that the order of elements described in each figure is given by way of example only. In an embodiment, the order of elements performed can be changed in any practicable way.

In some embodiments, the processes in FIGS. 2-4, or any portion or combination thereof, can be implemented as software modules. In other embodiments, the processes in FIGS. 2-4 or any portion or combination thereof, can be implemented as hardware modules. In yet other embodiments, FIGS. 2-7, any portion or combination thereof, can be implemented as a combination of hardware modules, software modules, firmware modules, or any form of program code.

As discussed above, embodiments of the invention can include systems and methods for concealed object detection using portable, battery operated, electromagnetic scanning apparatus (which can be called a Non-Physical Search Device or NPSD), attached to a variety of remotely controlled devices, including remotely controlled aerial devices known as drones, allowing for remote detection of body worn objects that would otherwise would have been concealed. Since the drone is mobile, and/or more than one drove can be used, the system can provide full 360-degree detections eliminating the need for the target to rotate or turn around ensuring a full body scan without officer intervention with the target.

As discussed above, upon activation, the NPSD emits non-visible electromagnetic radiation in the frequency band between 0.1 THz to 1 THz as part of the scanning and object detection process. In embodiments, the NPSD employs a phased array antenna in conjunction with a voltage-controlled oscillator (VCO) to steer the emitted beam to transmit electromagnetic radiation and deterministically illuminate the subject of the scan. Reflected electromagnetic radiation is received by an antenna on the apparatus and coherently mixed with the transmitted signal allowing differential phase and amplitude information to be recovered. The received signal is converted from frequency domain to time domain to produce an image. The resultant image is further processed using well known pattern matching and inferencing algorithms to identify objects within the field of view of the apparatus. The objects are compared against a local or remote database of known objects and the operator is alerted in the case of a match. It is also envisioned that images of the detected objects may be transmitted to the operator or to personnel in a remote operations center.

In an embodiment, an operator targets a remote subject and flies the drone to the target area. The operator (or user) can be a human, can include a series of pre-programmed instruction, or can be a combination of the two. For example, an operator can fly the drone to the target where a program can be executed to provide instructions to the drone to fly according to a prescribed path around a suspect and to automatically initiate scans at pre-defined points. In an embodiment, the process is automated such that the drone is configured to automatically identify and classify targets and to automatically take actions to perform the weapons detection scan.

Each drone can have a single or a plurality of NPSDs attached. In the case of a plurality of NPSD devices attached to a single drone, a drone would be capable of producing multiple scans to obtain multiple simultaneous images of a target or targets, either from different angles or at various different focal lengths from the target. In the case of the different focal lengths, each NPSD would be fitted with different lenses to change the focus length of the scan. For example, one NPSD could be fitted with a lens optimizing for distances from 7-10 feet whereas another NPSD could be fitted with a lens optimizing operations from 20-30 feet. The NPSD could also be fitted with lens that are moveable and capable of dynamically adjusting the focal length based on the distance to the target.

In an embodiment, a drone can be controlled to fly to within a predetermined practicable distance from the target and then position itself to complete a scan of the target. In an embodiment, the drone can be controlled to fly to within the operational range of the coherent radar imaging function. In an embodiment, the nominal range can be up to roughly 25 feet.

In an embodiment, the drone will move to multiple locations to get a substantially complete 360 view of the target and ensure coverage. To gather these multiple images, in an embodiment, the drone will use preprogrammed instructions and sensor data to automatically move to multiple locations to execute multiple scans. In an embodiment, the operator will command the drone to move to various location and execute scans of the target from each location. Sensor data received and/or sent by the drone may include (but is not limited to) GPS coordinates and location data, information based on images from a camera, accelerometer reading, ranging information from the radar scan process, drone telemetry, or other instrument data that allows the drone to establish location, speed, and distance information from the target or from potential obstructions. In an embodiment, data may also include information from other drones or sources allowing for multiple drones to coordinate positioning and target scans. For example, since a human subject is not transparent to the radar signals, two drones may be used to image a subject, with one drone imaging the front of the target while another drone images the back of the target, thus allowing for a simultaneous 360-degree scan of the target. In an embodiment, a scan will be restricted to a portion of the target subject (for example, a target's upper body, or a backpack). In an embodiment, the scanning beam can nominally scan over a roughly +/−25 degree arch, which is sufficient to cover an average-sized human at a distance of 7 feet.

In an embodiment, the NPSD employs a high definition video camera to allow for visual identification of the target prior to initiating a scan. Furthermore, the visual images of the suspect may be used as evidentiary data for future forensic evaluation. In an embodiment, the scan area, which is called the Field of View, or FOV, can be shown on the video image as a highlighted circle, or other nondescript shape, indicating the area to be scanned. The operator can either command the drone to move further away or closer to the target which either increases or shrinks the FOV, respectively. The operator can also reduce the FOV by reducing the sweep angle of the NPSD. Reducing the sweep angle allows the FOV to be focused on the target of interest, or on a specific area of the target. For example, a search may be restricted to a suspect's upper body, or a backpack, or an arm, or other portion of the total target area. In an embodiment, reducing the size of the area being scanned increases scanning resolution. In an embodiment, a scan of reduced size is used in conjunction with performing a broader scan where the broader scan is used to identify objects of interest, and the reduced or narrower scan is used to confirm the object type. As an example, if a maximum of +/−25 degree arc is scanned, resolution can be increased by reducing the scan to +/−10 degrees, which would be more focused and provide better resolution, thus improving the ability to image and detect a weapon.

In an embodiment, the target selection process can be controlled manually by an operator. In an embodiment, the target selection process can be implemented automatically using a set of programmed instructions and artificial intelligence (AI) algorithms that allows for automated target identification. In an embodiment, the AI algorithms use facial recognition algorithms to identify a specific target. In an embodiment, the target selection algorithms can also allow the NPSD to continuously scan multiple targets, and to associate detected objects with specific targets. This information may be stored or transmitted (or both) to a central database, allowing for a record of targets and associated detected objects. In an embodiment, this data is transmitted to a dispatch, command center, secure operations centers, or to other officers on handheld mobile devices or other portable devices for real time in theatre event management such as protest, riots, large events, and other similar gatherings.

Figure 6:
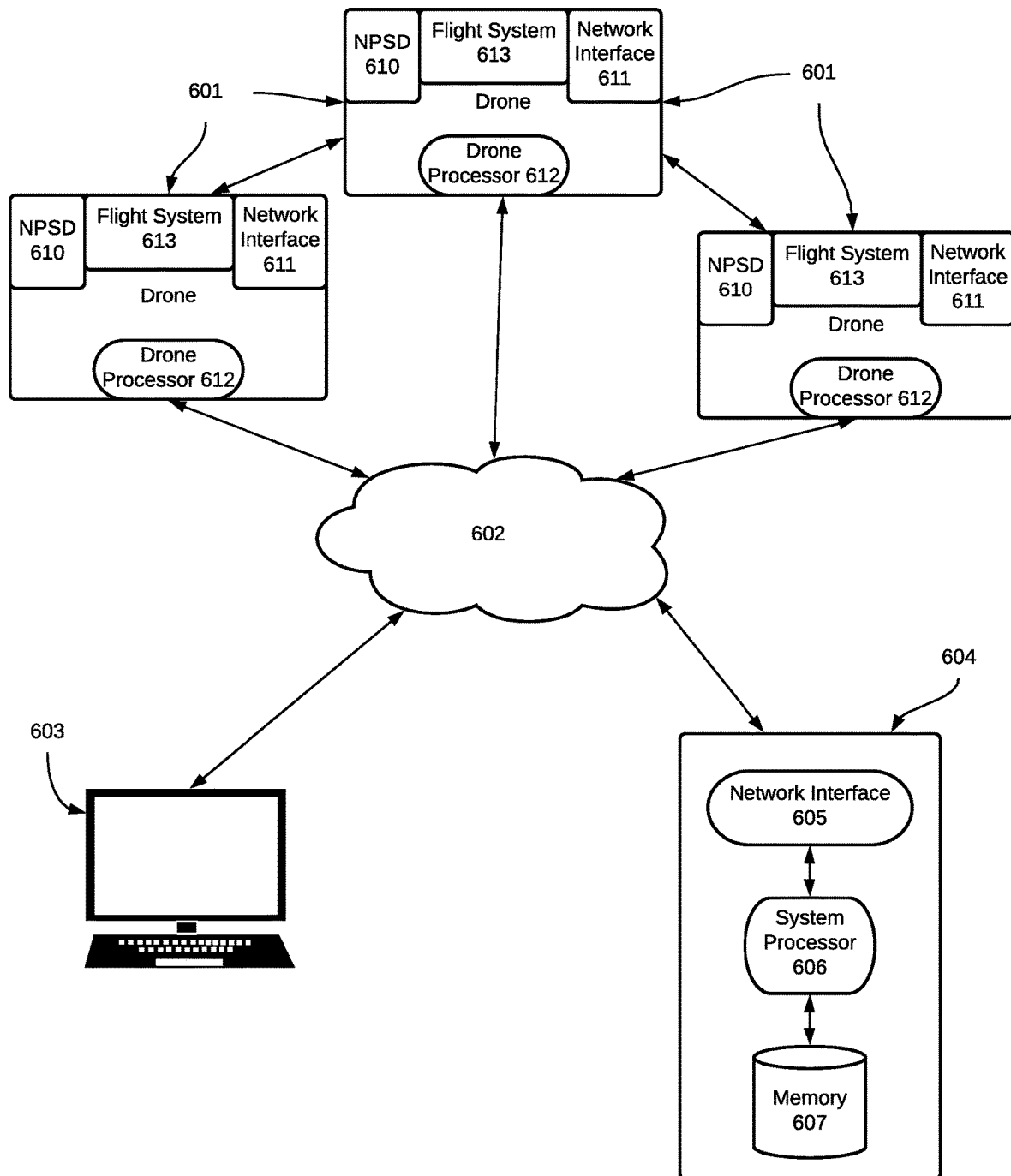
FIG. 6 is a block diagram of a system for using a drone or drones for a nonphysical search, according to an embodiment of the invention.

FIG. 6 is a block diagram of a system for using a drone or drones for a nonphysical search. In an embodiment, one or more drones 601 include at least one NPSD that is configured to be in communication with drone processor 612, network interface 611, and flight system 612. The communication among the components can be direct, or can be indirect via other components, buffers, or any other practicable system.

Each drone 601, user terminal 603, and remote system 604 are configured to be in communication with one another via cloud 602, through which they can send and/or receive instructions and data.

Drone 601 can include at least one NPSD 610 to provide remote scanning, a flight system 613, including a rotor or rotors, a network interface 611 for communications with other drones and other system components via network 602. Alternatively, a drone 601 can be in direct communication with another drone or drones 601 via any practicable wireless communications circuits including, but not limited to, a wireless fidelity ("Wi-Fi") or wireless local area network ("WLAN") connection, a wireless wide area network ("WWAN") connection, a Bluetooth connection, an LTE/5G connection, and/or a cellular connection. In an embodiment, drone-to-drone direct communication can include sharing data and instructions for simultaneous imaging of a target from multiple angles. For example, three drones may position themselves (or be positioned) in a circle above the target and spaced 120 degrees apart allowing for three independent scans of the target allowing for a 360 scan without the target needing to move.

Drone 601 further includes drone processor 612 which is configured to process received signals and/or data, and provide instructions to flight system 613 and NPSD 610. An example of drone to drone communication ids for simultaneous imaging of a target from multiple angles, In this example, three drones could be placed in circle above the target spaced 120 degrees apart allowing for three independent scans of the target allowing for a 360 scan without the target needing to move.

In an embodiment, drone or drones 601 can be controlled via a signal originating from user terminal 603 including instructions for where to fly, what objects and/or people should be targeted, and from what angle. In an embodiment, a user can use user terminal 603 to communicate policies, rules, and/or preferences to remote system 604. Remote system 604 is configured with memory 607 to store instructions and policies to be conveyed to drone 601. Such policies, rules and/or preferences can be processed by system processor and passed on to drone 601 through network interface 605 and can include where and under what conditions to move drones, whether to interact with other drones, whether to interact with user terminal 603, when and/or where to start scanning, and results of the scanning operation.

Drone 601 includes NPSD 610 for performing scans under appropriate conditions or under direct or indirect instructions, drone processor 612 that can receive instructions via network interface 611 and/or send instructions to tell RSOC 610 to begin scan, or where to target such a scan. In an embodiment, drone processor 612 can receive and/or send instructions to flight system 613 to tell the drone where to fly, where to point, what target to select, an area of the target to scan, and to execute the scan process. In an embodiment, drones can interact directly with one another to exchange and/or provide data, telemetry, and instructions. This can be done through network 602. Alternatively, multiple drones 601 and be in communication with one another directly through any known and practicable wireless networking protocol.

In an embodiment, user terminal 603 is configured to be in contact with drone via network 602. User terminal 603 is configured to be used by a user to provide instructions to drone 601 to turn on/off, to fly to a certain location, select a target, select a FOV, initiate or end a scan, transmit weapons detection results, and transmit results of a scan to certain devices or to a central database. User terminal 603 can also be used to provide input for policies and instructions that can be stored directly in a drone 601, or can be stored in remote system 604 to be provided to drone 601 at a later time.

Remote system 604 includes memory 607 configured to store policies, instructions, instructions, data, metadata, video, radar images, weapons-detection results, and other computer code. Such policies, instructions, data, metadata, video, and radar images, weapons-detection results, and other computer code can be provided to drone 601 via network 602 through network interface 605. Remote system 604 further includes system processor 606, which is configured to process policies, instructions, data, and metadata, whether received from user terminal 603 or from drone or drones 601, and provide instructions to drone 601 based on such policies, instructions, data, and metadata. Remote system 604 is also configured to provide information to user terminal 603, based on input from drone 601, including processed results from a an RSOC scan to provide a user with information on scanned objects.

Figure 7:
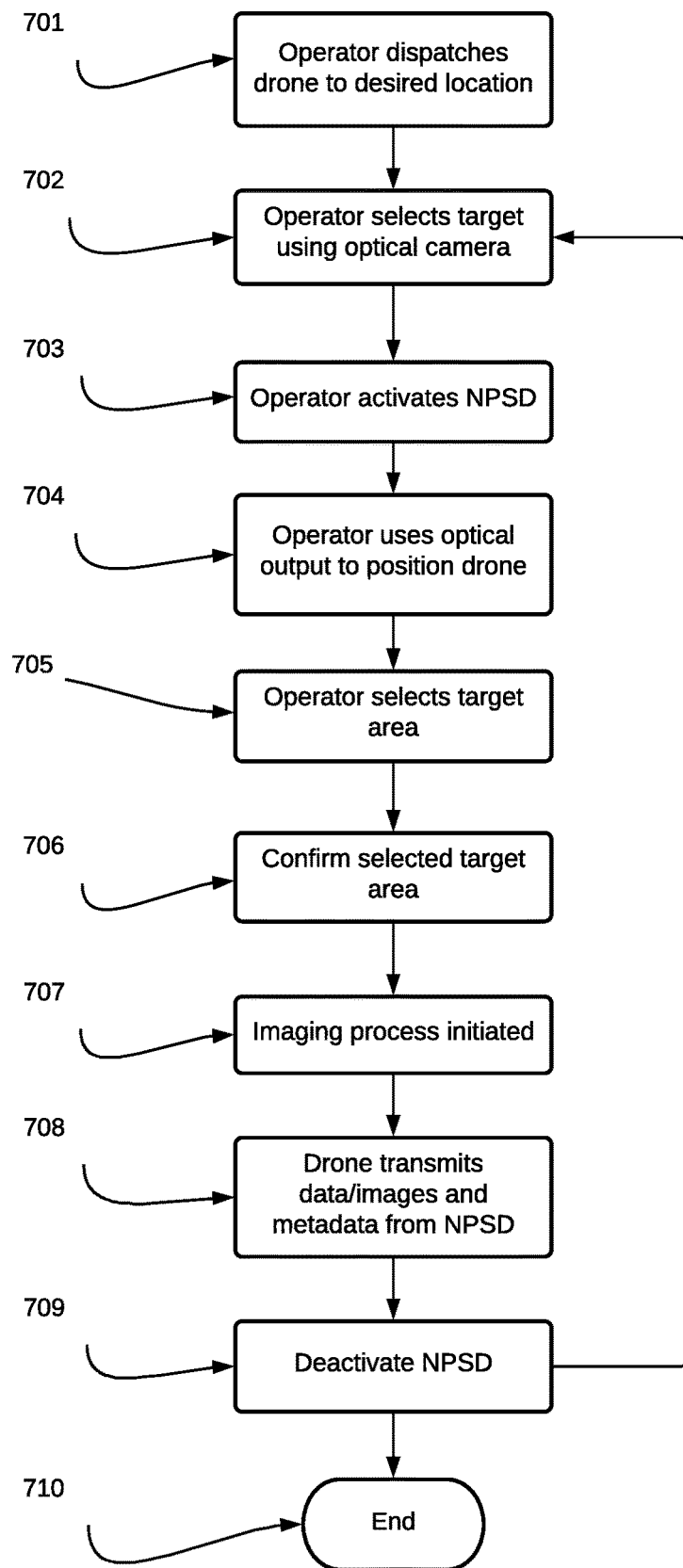
FIG. 7 is a flowchart of a method for using a drone or drones for a nonphysical search using an operator-controlled scan, according to an embodiment of the invention.

FIG. 7 is a flowchart of a method for using at least one drone for a nonphysical search using operator control, according to an embodiment of the invention. In an embodiment, at 701, an operator (also called a user) dispatches at least one drone to a desired location. The dispatch can be through network communication with the drone, using Wi-Fi, Cellular, or any practicable communication protocol. In an embodiment, the operator can communicate with the drone via a wired network.

At 702, the operator selects a target for scanning. In an embodiment, the target is selected via a camera mounted on the drone and configured to output an image to be received by the operator. In an embodiment, the target is selected by a person working with the operator who receives the output from the optical camera and conveys the received target information to the operator.

At 703, once the target is selected, the operator sends a signal to activate the NPSD, which responds by sending ranging data. In an embodiment, the ranging data is sent continually. In an embodiment, the ranging data is sent intermittently based on time, position, or other necessary factors. At 704, the operator uses the received data to command the drone to move until it is at the desired altitude, attitude, and range, for scanning. In an embodiment, the operator receives telemetry data, which is used to calculate the position of the drone in relation to the target. In an embodiment, the position data (which can include any of ranging data, altitude data, attitude data, location data, orientation data, and distance from the target data) can be determined using optical, laser, or other visual information to identify the target and/or the area to be scanned. In an embodiment, the operator may use GPS data to determine an appropriate position for the drone. At 705, the operator uses a projection or superimposition of the FOV on the camera image to select the target area on the target for scanning. In an embodiment, the operator selects the target area by highlighting areas of interest on the received optical image with the drone automatically moving into position allowing it to scan the highlighted FOV. In an embodiment, the operator may execute the scan without using the camera to select the target area. The drone, at 706 sends a signal confirming the target area. In an embodiment, the selected target area is confirmed through a visual overlay or superimposition on an optical target image. The confirmation signal can be sent to the operator or to a remote system. In an embodiment, the NPSD can confirm the selected target and then transmit data to the operator, which would display the visual indication of the target using an overlay on the camera image. Upon confirmation, the operator will execute the scan.

In an embodiment, once the confirmation of the selected target area is sent, the drone can position itself accordingly to initiate the scan using the RSOC. In an embodiment, once the confirmation signal is received, the operator (or the remote system) can send a signal to the drone directing it to a specific position for scanning. Once in position and using GPS data, radar ranging data, or other location information determined by other means, the NPSD initiates the radar scan automatically; in an embodiment, the drone can wait for a signal from the operator (or the remote system) to initiate the scan.

At 708, the drone transmits information, which may include any combination of data, images, GPS coordinates, weapons detection results, and metadata, from the NPSD based on policy for storage in a central database, or to other devices authorized in the policy. In an embodiment, the drone transmits the information to a remote system for storage and/or processing. Once the process is complete, the NPSD can be deactivated or returns to standby mode at 709. If the results of a radar imaging system indicate the presence of object meeting the criteria of a weapon, the processor making that determination can send a signal to the operator and/or the drone to end the process. If insufficient information has been received from the radar-imaging processing, or if there were other artifacts causing the image to be inaccurately rendered or to make such a determination, the steps can be performed again starting at 702 (or any necessary steps between and including steps 702 and 709), and can be reperformed as many times as necessary until a definitive determination can be made as to whether an improper item has been found.

Figure 8:
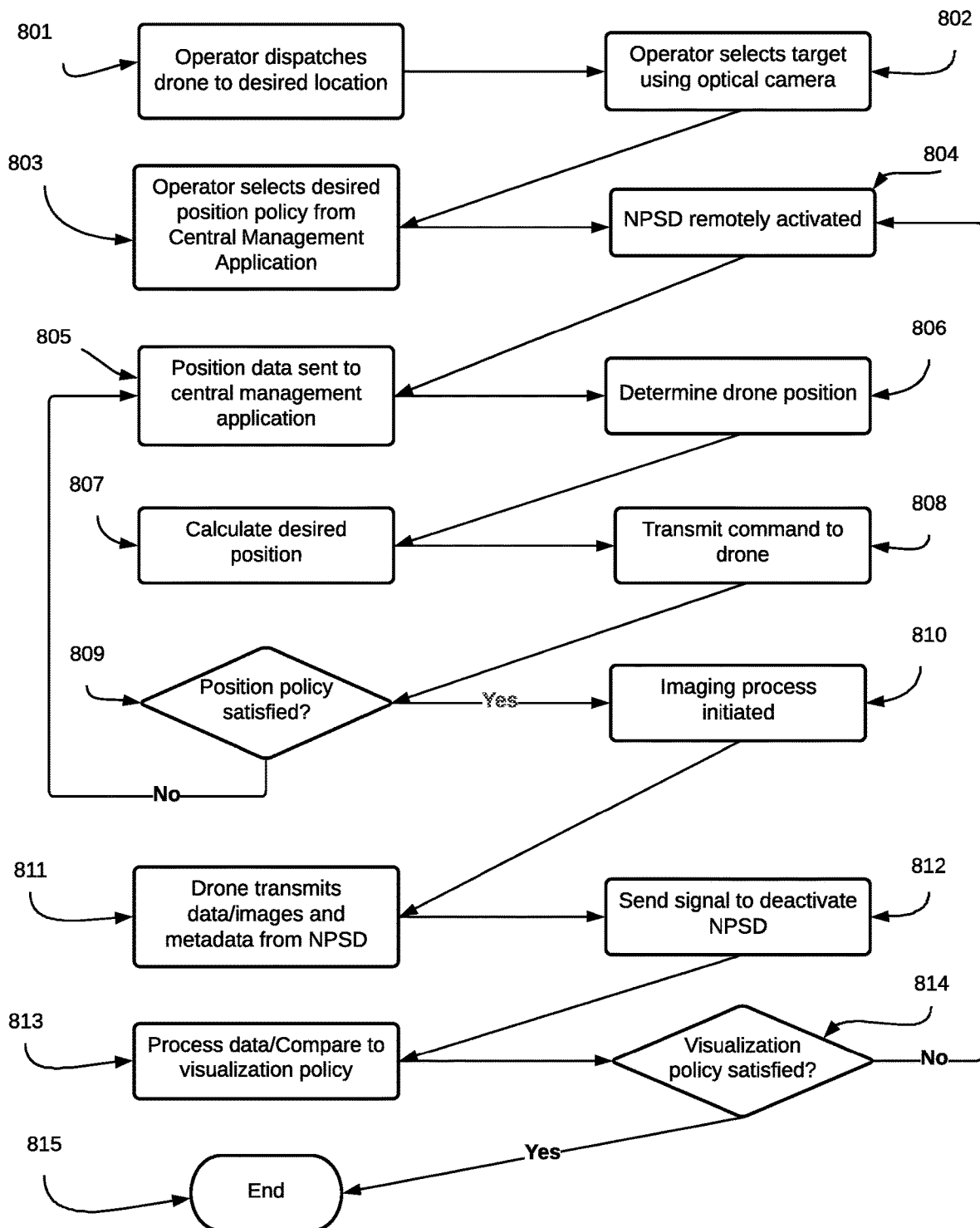
FIG. 8 is a flowchart of a method for using a drone or drones for a nonphysical search using a partially autonomous scan, according to an embodiment of the invention.

FIG. 8 is a flowchart of a method for using a drone or drones for a nonphysical search using operator input of policies and/or controls for a partially autonomous NPSDS scan, according to an embodiment of the invention. At 801, the operator dispatches the drone to a desired location, and at 802, the operator selects a target using an optical camera. Either or both of steps 801 and 802 and be performed directly by the operator, or indirectly by the operator using a partner, or using a remote system capable of storing policies, processing data, and transmitting instructions or information to the operator and/or the drone. In an embodiment, camera output is received from the optical camera at the remote system. In an embodiment, the drone position is automated based on predefined instructions. The remote camera system processes the output, determines the target, and then conveys the target information to the operator to move the drone to a desired position or location. In an embodiment, the remote system sends the target information and/or instructions directly to the drone which then executes instructions to move the drone to the desired location.

At 803, the operator uses a computer terminal to select a desired position or a selecting a policy governing the desired location which could also include instructions indicating the flight path of the drone. At 804, a NPSD scan is remotely activated by the central management system. At 805, position data, including but not limited to GPS data, visual image data, attitude data, and distance-to-target data, is transmitted from the drone or drones to the central management system, and at 806, the position data is used to determine the drone position, including (but not limited to) location, range, and attitude relative to the target. At 807, a desired scanning position for the drone (including but not limited to location, range, and attitude relative to the target) is calculated at the central management system, and at 808, the central management system transmits a command to the drone to move to the calculated position. In an embodiment, the central management system transmits the command to a user who then sends a signal to the drone to move according to the calculated position received from the central management system.

In an embodiment, a target is selected via direct visualization by the operator or by a person working with the operator. Once the drone is in the desired position based on the visual data, the operator can make fine adjustments of the drone position using the ranging data from the NPSD to ensure that the NPSD is in range and that the target is aligned with the desired FOV. At 809, the central management system determines whether the position policy has been satisfied. For the purposes of the present invention, the term position policy refers to the rules that define the preferred position of the drone relative to the target, and can include (but not be limited to) altitude from the ground or from an object, orientation relative to a target or object, location coordinates, attitude, yaw, tilt, horizontal and vertical distance to the target, the position of the target, the orientation around the target, the speed of the drone or the target, the drone's next position. In an embodiment, some or all of these position indicators can be represented as GPS coordinates. In an embodiment, once the drone moves to the calculated desired position, the drone determines whether the position policy has been satisfied. In an embodiment, a drone can move in a predetermined pattern such as, for example, a circle, around a target. If the position policy has not been satisfied, steps 805 through 809 (or any necessary steps in between) can be rerun until the position policy is determined to be satisfied.

Figure 9:
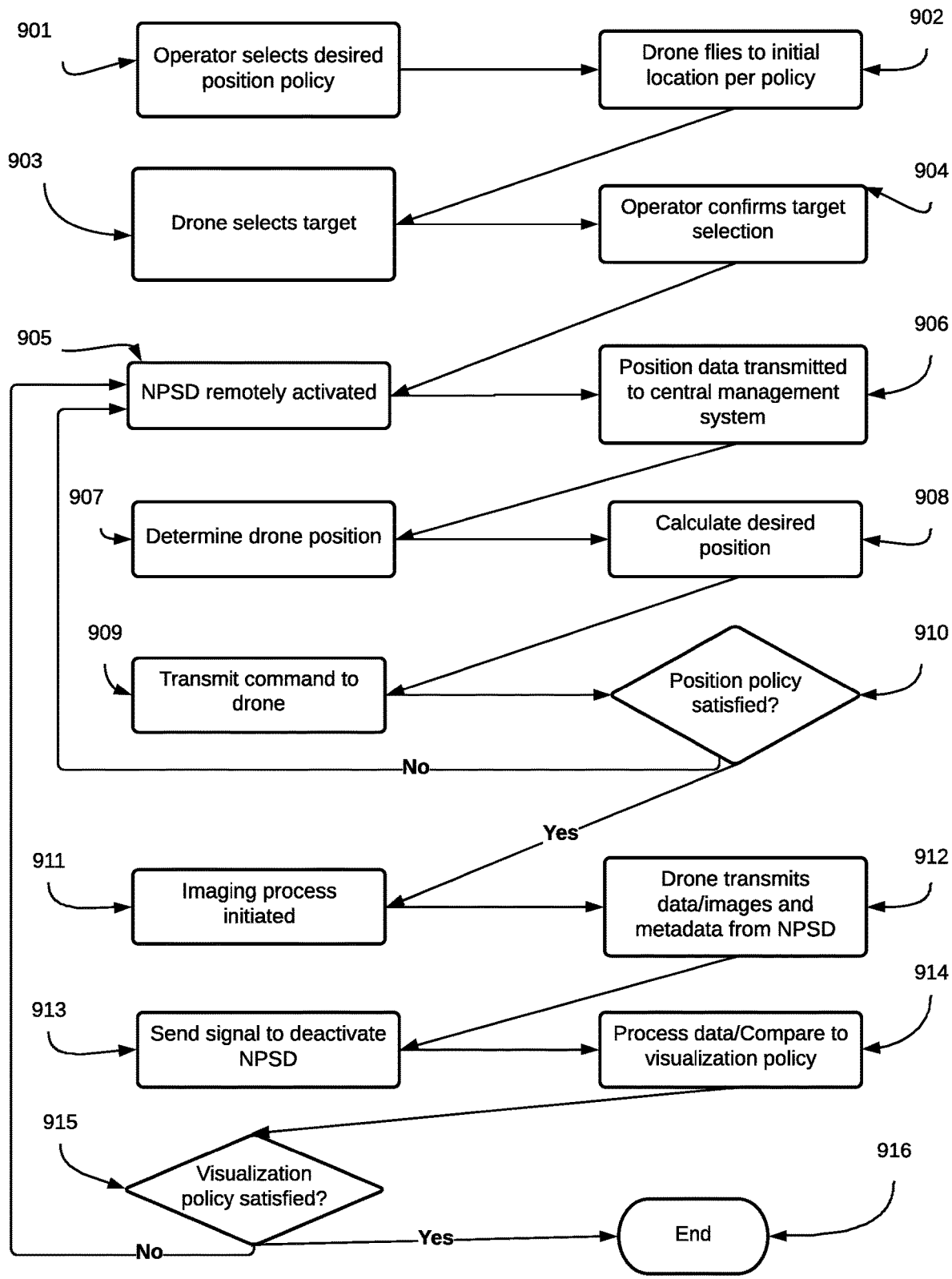
FIG. 9 is a flowchart of a method for using a drone or drones for a nonphysical search using a fully autonomous scan, according to an embodiment of the invention.

If the position of the drone satisfies the position requirements per the governing policy, then at 810, the NPSD scanning and imaging processes are initiated. Once scanning data is obtained, then at 811, the drone transmits the camera images, radar scan images, results of the weapons detection process, and other data and metadata to the central management system. In an embodiment, the drone transmits the data and metadata to the user terminal which then sends the deactivation signal to the NPSD. At 813, the received data and metadata are processed and compared to a visualization policy. In an embodiment, the central management system stores the received data and metadata. At 814, the central management system determines whether the visualization policy has been satisfied. In an embodiment, the determination of whether the visualization policy has been satisfied takes place at the user terminal. If the visualization policy has been satisfied, at 815 the process ends FIG. 9 is a flowchart of a method for using a drone or drones for a fully autonomous nonphysical search using predetermined policies and/or controls, according to an embodiment of the invention. At 901, an operator selects a desired policy from a central management system. At 902, the policy is transmitted to the drone and the drone flies to the initial location pursuant to the policy. At 903, the drone selects a target for scanning, which, at 904, is confirmed by the operator who then sends a confirmation signal to the drone. In an embodiment, target selection is initiated by the operator using video or still images from the camera. In an embodiment, the images are visual. In an embodiment, the images are thermal. In an embodiment, the position policy is transmitted from the operator to the drone. In an embodiment, the position policy is transmitted from a central management system to the drone. In an embodiment, the central management system is located remotely to the user's computer terminal. In an embodiment, the central management system is located on the user's computer terminal.

At 905, the NPSD is activated by the central management system via an NPSD command interface through a network connection, and at 906, position data (which can include, but not be limited to, ranging data and location information, GPS data, visual image data, and attitude data relative to the target) is transmitted to the central management system. In an embodiment, the data is transmitted continuously. In an embodiment, the data is transmitted intermittently. Using the received position data, at 907, the central management system will repeat the previous step until the drone is in the desired location to initiate a scan. At 908, a desired position for scanning is calculated and a command to move to the calculated position is transmitted to the drone at 909. In an embodiment, the calculation in 908 can include factors such as GPS data, attitude, yaw, and other orientation data, and radar ranging data. In an embodiment, the central management system tracks the drone using the GPS coordinates broadcast from the drone, and at 910, the contents of the signal are received by the central management system and are used by the central management system to determine whether the position policy is satisfied by comparing received data to the policy. In an embodiment, radar ranging information is broadcast to prevent the drone from colliding with unexpected obstacles. In an embodiment, the NPSD ranging data is directly transmitted to the drone flight system to avoid an obstacle. In an embodiment, the NPSD ranging data is directly transmitted to an operator to allowing the operator to command the drone to change course and avoid obstacles.

If the position policy is determined not to be satisfied, steps 907 through 910 (or any necessary steps therein) are repeated until the position policy is satisfied. Once the position policy is satisfied, at 911 the NPSD receives a signal that results in the NPSD initiating the RSOC image process. In an embodiment, the NPSD can automatically initiate a scan upon meeting the position requirements of the policy. At 912, the drone transmits image data and metadata to the central management system, which sends a signal to deactivate the NPSD at 913. At 914, the received data and metadata are processed and compared to a visualization policy to determine, at 915, whether an improper object, or some other object, is found. For the purposes of the present invention, a visualization policy is a set of rules based on certain physical characteristics of a target or a background to the target. In an embodiment, such rules can be based on any combination of facial features, body outline, carried object, height, hair color, body shape, clothing type and appearance, and any other physical features that can be used to identify a target. If the visualization policy is not satisfied, then steps 905 through 914 (or any practicable subset thereof) can be repeated until the visualization policy is satisfied. Once the visualization policy is satisfied, then at 916 the process ends.

In an embodiment, a drone is configured to broadcast audio commands to scanning subjects, either through user interaction or through a predetermined set of instructions based on data received from the drone, or based on data received from other drones. In an embodiment, a drone is configured to use a camera to take still or video images of the subject, and to transmit such images to a user or to a central management system either alone or superimposed on an NPSD generated image.

Figure 10:
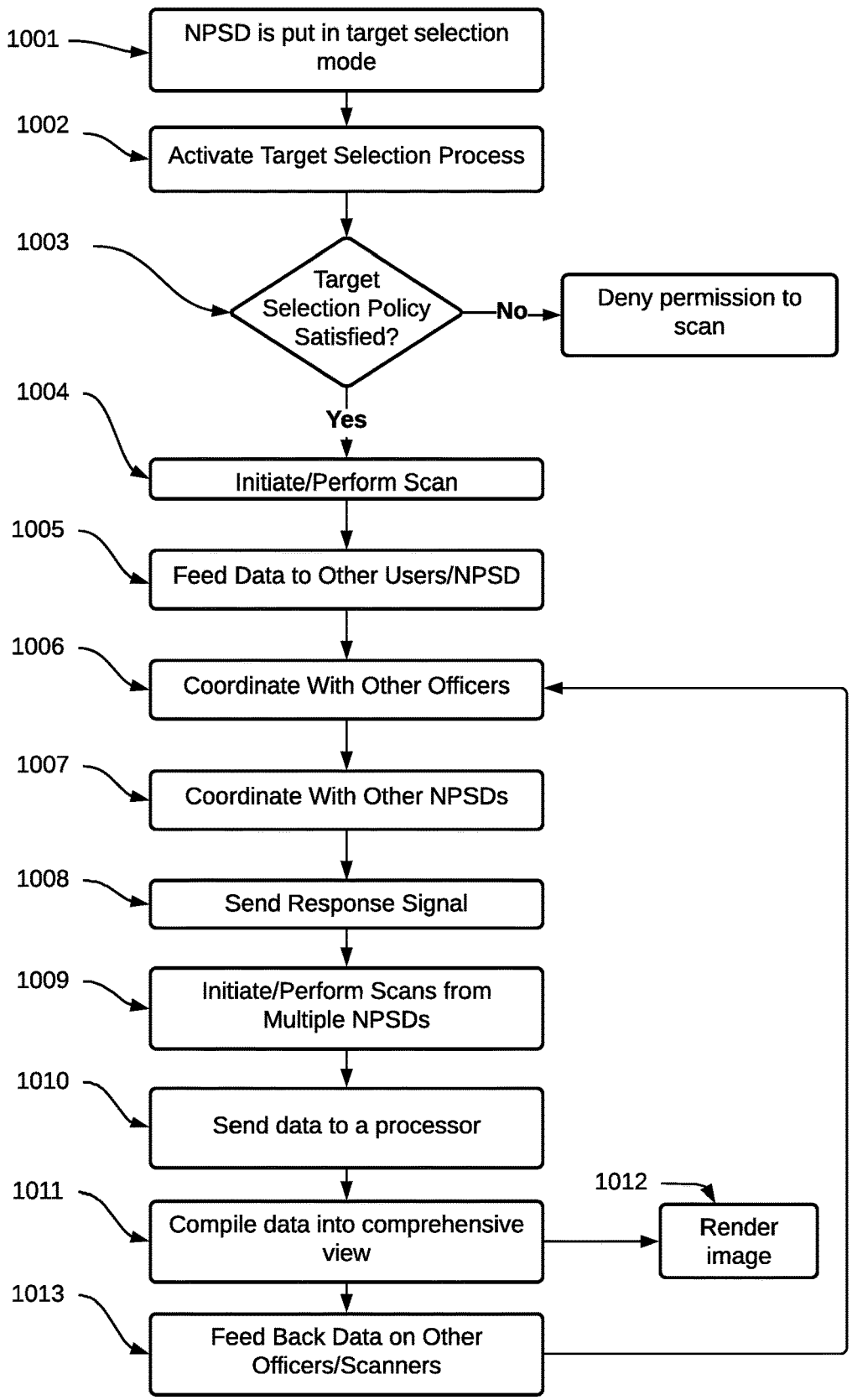
FIG. 10 is a flowchart of a method for coordinating a nonphysical search performed by a drone with other individuals and/or drones, according to an embodiment.

Multiple portable or movable NPSDs can interact with one another, and can interact with people such as civilian device users, police officers or security personnel (collectively, "users" or "officers"). Such portable devices can be drone mounted, automobile mounted, user-worn NPSD, or any other practicable portable or movable device as dictated by a given use case. FIG. 10 is a flowchart of a method for coordinating a nonphysical search performed by a movable NPSD with other individuals and/or movable NPSDs, according to an embodiment. One skilled in the art will understand that the description of embodiments of the invention is given in the context of a drone mounted NPSD, but that any practicable movable and controllable device can be substituted for a drone. For example, the NPSD can be a handheld device, or a body-worn device, or a vehicle or dashboard mounted device. At 1001, a drone mounted NPSD is put into target selection, or ready, mode. The NPSD can be put into target selection mode via a signal sent by a user, a signal sent by a central management system, or via an automated process in which a processor onboard the drone determines whether certain policies have been satisfied, and if so, a processor onboard the drone sends a signal to the NPSD to enter into target selection mode.

In an embodiment, in target selection mode, the NPSD energizes a scanner pointing mechanism (a "pointer"). One example of a pointer is a targeting mechanism implemented as a laser mounted on the drone (for example, a solid state laser) capable of projecting a dot, a cross hatch, or any other shape onto the target that is useful to indicate the center of the field of view or other targeting parameter to aid in aiming the NPSD scan.

At 1002, the target-selection process is initiated when the NPSD receives instructions to aim at a specific target for scanning. In an embodiment, the NPSD can receive instructions from a user to aim at a specific target for scanning. In an embodiment, the NPSD can receive instructions from a central management system to aim at a specific target. In an embodiment, the NPSD can receive instructions from a processor mounted on or in the drone to point at a specific target, where the processor identifies a target based on data received from the NPSD or from a central management system, and calculating whether the data satisfies a certain policy.

In general, a policy is a combination of specific rules, and determining whether a policy is satisfied or not triggers a set of instructions carried out by the NPSD or the system (or some combination thereof). Instructions can be combined logically using Boolean combinatorial logic, stateful, or use programming constructs such as "if—then—else." Instructions can include, but are not limited to, instructions to: (i) send raw scan image results, (ii) determine and send a confidence level of a detected weapon, (iii) initiate a scan, (iv) record camera data, (v) send a confidence score for a detected object (i.e., the degree of confidence that a certain class, or specific type, of object has been detected), (vi) send device orientation such as direction, pitch, yaw, tilt), (vii) send camera data, (viii) send an alert to a user, (ix) send a time stamp, (x) send a still or video image, (xi) send data providing the current state of the NPSD, (xii) send GPS data, (xiii) send data regard the current health of the NPSD, (xiv) send contents of the system memory, (xv) send a command to disable the device, and (xvi) enter standby mode.

In addition to multiple criteria for given policy, a device or a system can have multiple policies that are combined logically using Boolean logic. In addition, policies can be stateful or use programming constructs such as 'if—then—else' or other conditional expressions used on software-based systems. Policies can be triggered by any one or combination of events, conditions, signals, manual inputs, or queries. Examples of events can include (i) geofencing (a determination of location in or out of a predefined area using onboard real-time GPS location coordinates or location information derived from Bluetooth, Wi-Fi, cellular, or other practicable protocols), (ii) a scan initiated by the user, (iii) an even timer set to generate events at a predetermined time or times, or repeatedly at regular intervals, (iv) whether and what type of weapon has been detected by exceeding an predetermined threshold of matching, (v) data sent from an accelerometer above a predetermined threshold, possibly indicated that a user is in distress or has dropped the user device, (vi) device battery status reaching a predetermined value, (vii) device memory capacity reaching a predetermined threshold.

At 1003, a processor receives data from the NPSD about an aimed at target, and based on that data, the processor determines whether or not to initiate the scan based on whether certain policy considerations have been satisfied. The processor can be located on or near the NPSD, including being mounted on or inside the device to which the NPSD is mounted. For example, the processor can be in the housing of a handheld scanner, or can be located inside a drone containing the NPSD. Alternatively, the processor can be located on a user control device such as a mobile telephone or body mounted or dashboard mounted control panel. The processor can likewise be located at a central management system. One skilled in the art will understand that the term "processor" can include multiple pieces of hardware and software, and the processing discussed herein can be divided among such hardware and software in any practicable way. For example, some processing can be performed on a drone mounted device while the rest of the processing can be performed by a device located at a central management system. For the purposes of the present invention, regardless of how the processing is divided, unless explicitly stated otherwise, the collection hardware and/or software that performs the processing is referred to as a "processor."

For example, GPS data can be sent to a central management system that then determines, based on that GPS data, whether the drone is aiming at a target within a predetermined area, thus satisfying a geofencing policy. For example, a GPS device mounted on the drone can determine whether the drone is within a certain predefined area, and if so, the electronics on the drone can begin searching for targets. If the target is determined to be within a specific predefined area where scanning is allowed, the central management system sends a signal to initiate the scan. If, on the other hand, the target is determined to be within a predefined area where scanning is not allowed, the signal to initiate scanning is not sent. In an embodiment, the processor in the central management system sends a signal that prevents the NPSD from initiating a scan, and further sends a signal to change location or to aim at a different target.

As an example of a use case of geofencing, many places exist where guns are banned, or are illegal to carry. These places typically include schools, courthouses, airports, government facilities, and private venues. They may also include public events such as protests or other ad hoc events where large groups may gather. In these cases, a public safety official may see a benefit in not alerting the public about the scan, but instead to scan and broadcast the results of the scan (automatically or manually) to other local safety personnel, or to a SOC or other central management system for centralized coordination.

In an embodiment, if the relevant policy is not satisfied, the central management can refrain from sending a signal to initiate a scan, or the central management system can send a signal explicitly denying permission to scan. For example, the central management system can send a signal preventing the NPSD from initiating a scan, or to change the NPSD's location, or to point at a different target. In an embodiment, a processor located on the user device can determine whether the appropriate policies have been met, and based on that determination, can automatically send the scan or don't scan signal (or no signal at all) without input from a user, a user device, or from a central management system.

In an embodiment, the scan can be initiated by the user pressing a button on a control device, by voice activation, automatically by the NPSD upon identification of the target and upon satisfaction of the relevant policy, or remotely over a network interface by an operator using an application at a remote, central management system such as a dispatch, SOC, or mobile command center. In an embodiment, a user device can receive a signal from a central management system, and based on the contents of the signal, the user will override the signal. At 1004, if the policy considerations are satisfied, the NPSD performs the scan, initiating the process of looking for and identifying an impermissible object (e.g., a weapon).

In an embodiment, if the target selection policy is satisfied, the data received by the first drone (either prior to or subsequent to initiating the scan) is sent, directly or indirectly, at 1005, to other users and/or other scanners. This data, or coordination signal, can then be used by other officers and/or other scanners to coordinate their response. In an embodiment, other officers receiving location data from the drone can determine whether they are close by and able to assist. In an embodiment, other users can receive a still or video image of a target, which can help them locate the target. In an embodiment, the data from the first drone can be sent to a central management system which can then coordinate a response by contacting one or more additional officers, or by sending a signal to one or more NPSD or to one or more additional drones to aid in response. Officers can be selected based on a variety of conditions including proximity, officer availability, officer type, urgency of situation, type of situation (e.g., an officer under fire), or other custom scenarios pre-programmed into the NPSDs.

In an embodiment, at 1006, data and/or instructions can be sent from the central management system or from the drone or from the user or user device to provide information for coordinating a response. Such data and/or instructions can include: (i) instructions to request additional NPSDs to scan, (ii) the locations of additional NPSDs, (iii) the estimated time of arrival of other NPSDs to an area proximate to the first user, the first user, or the target, (iv) a location and/or orientation where one or more additional NPSDs can move to perform a scan, (v) what weapons or other items are present, (vi) which individuals are carrying weapons, or other pertinent data.

Coordinating information can further include information alerting other officers that a weapon has been detected, the GPS coordinates of the location of the weapon, images of the target, images of the weapon, Officer ID, and other data useful to a responding officer. Other information may include still images, video, weapons data, geolocation data, device orientation data, alerts about weapons or crowd size, or other data resulting from NPSD scans, time stamping, and other meta data that could result from use of the NPSD be shared. In an embodiment, the information is shared dynamically with other authorized field users, including additional police officers or security guards (generally called "officers"), one or more drones, or others. In an embodiment, the information is transmitted to a central location such a Security Operations Center (SOC), a police dispatch, or others. The information transmitted to the central location can be securely stored in a server based backed centralized management and storage system, which could be a physical server or in a cloud based server system, for use in, for example, providing evidence at trial. In an embodiment, the stored data is used to train an artificial intelligence ("AI") object recognition engine to improve inferencing capability on the NPSD to improve the weapons detection process, or more generally an object identification process when searching for an object such as a specific type of weapon, or an object that can fall under a general category of being a weapon.

In an embodiment, the instructions to coordinate with additional officers can be sent from the user who is directly managing the NPSD search, rather than from the central management system.

At 1007, based on a signal received from the first drone (either directly, via a central management system, or from a first user or user device), multiple NPSDs can coordinate their response by sending data and instructions to one or more NPSD. Such data and instructions can include: (i) instructions to request additional NPSDs to scan, (ii) the locations of additional NPSDs, (iii) the estimated time of arrival of other NPSDs to an area proximate to the first drone, the first user, or the target, (iv) a location and/or orientation where one or more additional NPSDs can move to perform a scan. In an embodiment, multiple NPSDs coordinate their response communicating directly with one another. In an embodiment, the multiple NPSD coordination is performed by multiple officers or users of the NPSDs who communicate directly or by radio or other data transmissions, thus improving the image clarity, detection of the object, identification and classification of the type of object, and identification of the placement of the object. In an embodiment, the multiple NPSD coordination is directed and/or controlled by a central management system. In addition, the information from multiple responses can be fed back into the relevant AI engine to further improve processing for future scans.

NPSDs units receiving data can be programmed to respond to the sending device, as well as to a central management system, and so at 1008, a response signal is sent from the NPSD. The response signal can include sending: (i) an acknowledgement of receipt (ACK), (ii) GPS coordinates of a receiving device to provide the receiver's location, (iii) a video or image data (including an NPSD-generated image), (iii) the status of the responding user's device, and (iv) any other information as deemed necessary. The responding device can be programmed to send any of the information above, and the response can be implemented in the policy framework used by the system.

Once the multiple NPSDs are ready (i.e., they are in an appropriate location and have identified the target), they perform the coordinated scans, at 1009. At 1010, data is sent to a processor where, at 1011, events from multiple NPSD are compiled and processed to provide a comprehensive overview of the area, as well as a comprehensive view of the scanned target or object, that can be rendered on a visual display. For example, three drones, each with an NPSD could be positioned at 120-degree intervals to get a 360 degree view of the target without having the target move or rotate. The data, as in the one-to-one use case, would be transmitted to other devices and/or the central management system (e.g., an SOC, a dispatch, a mobile command, etc.). In an embodiment, multiple scans can be combined into a single image to enhance the resolution or the field of view of the object. In an embodiment, the multiple scans can be rendered adjacent to one another to allow a user to analyze the target from different vantage points. At 1012, the image is rendered in a visual display. In an embodiment, the rendered image is an overlay of data from the multiple scans. In an embodiment, the rendered image includes a plurality of views rendered adjacent to one another.

At 1013, information about the location, response time, capabilities, type of officer, stored visual and/or radar images, and any other necessary information of other officers is fed back from the central management system or from the drone to the user. In an embodiment such data can be fed back to other officers to coordinate a response. In an embodiment, data can be fed back to other drones or to other NPSDs to coordinate a scan on the existing target or to provide new scans on new targets. The data fed back can include, for example, an alert from an NPSD to a single officer or a group of officers in local proximity, to a dispatch center, or to a mobile command.

In an embodiment, officers (or other authorized users) who receive the sent data can be provided with information including: a weapon detection event, or whether a weapon was detected with a match calculated using artificial intelligence that exceeds a specific threshold. The data can also include information about a weapon or weapons or other objects that did not meet the threshold for being considered a specific weapon.

At 1012, the data is sent to a processor to run a set of instructions to render the image on a display. Image rendering can be performed in any known and practicable way, and may include different types of visualization of data such as pictorially, graphically, or textually.

Figure 11:
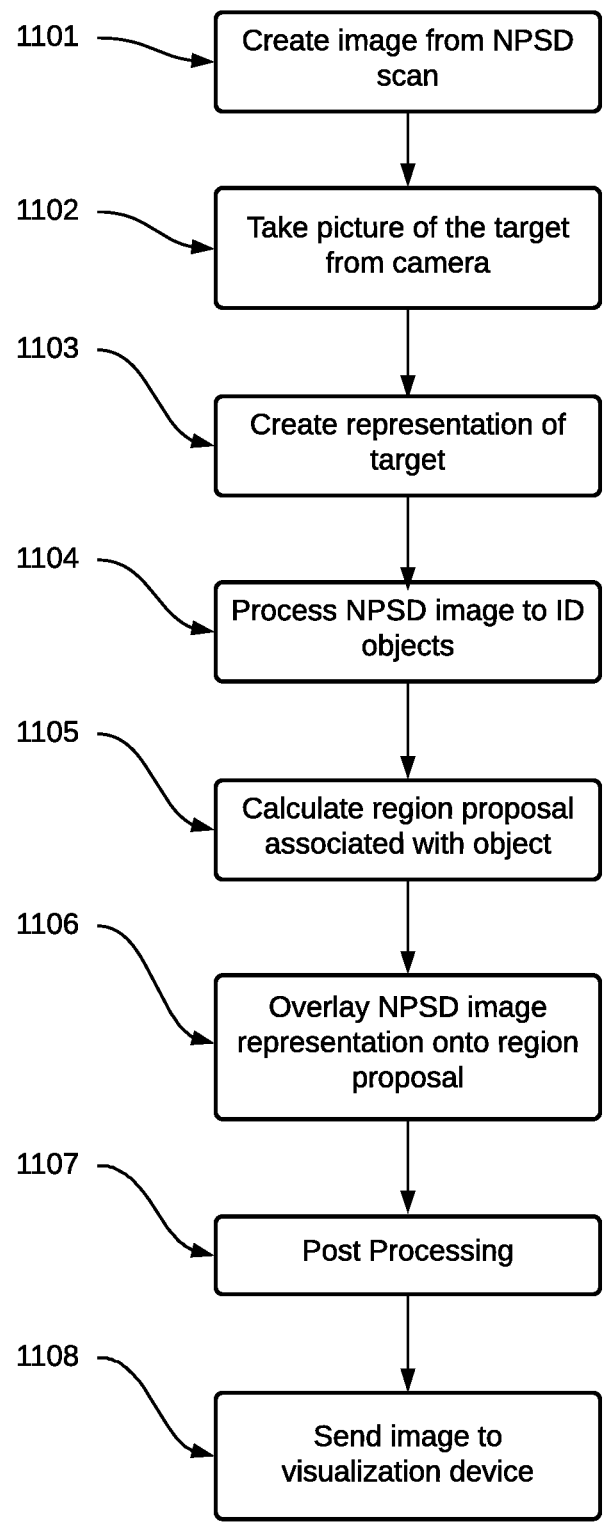
FIG. 11 is a flowchart of a method for rendering an image of an object on a scanned target, according to an embodiment.

The data can include images showing the type of weapon detected, and the location on the target where the weapon is located. FIG. 11 is a flowchart of a method for rendering an image of an object on a scanned target, according to an embodiment. At 1101, an image is created from a scan by an NPSD. The NPSD-based image can be created in any known way.

At 1102, a camera takes a picture of the target for use in creating a visual representation of the target that can then be used as a basis for overlaying or superimposing the NPSD-based image on a representation of the target. For the purposes of the present invention, the terms "overlaying" and "superimposing" are used interchangeably.

At 1103, a visual representation of the target is created. The visual representation can be a generic or anonymized silhouette or outline of a target either based on the picture taken by the camera, or based on a standard generic image previously stored by the system. Alternatively, the visual representation can be the picture taken by the camera, or can be an extrapolation of a target based on the picture taken by the camera.

At 1104, the image created from the NPSD scan is processed to identify objects on or otherwise carried by the target. Objects can be identified to a calculated confidence level (using artificial intelligence or otherwise) based on predetermined rules as being a member of a general category of objects (e.g., being an impermissible object), or can be identified and classified more specifically (e.g., a handgun).

Once an object is identified or suspected, a region proposal associated with the object is calculated, at 1105. For the purposes of the present invention, the term "region proposal" means an area on the target where an object was detected, and the region on the target where the visualization of the object will be placed. One skilled in the art will understand that calculating a region proposal means calculating the appropriate size and location of a region based on the object found and the location of the object on the target, and mapping that region onto the visualization of the target.

Once a region proposal is sized and mapped onto the target visualization, at 1106, a representation of the NPSD-based image is overlayed or superimposed onto the region proposal. The NPSD image can be the raw image or the full results of the NPSD scan, or it can be an enhanced or zoomed-in image to show the object in more detail. In an embodiment the NPSD image is replaced by an anonymized shape such as a box that can include data such as an object classification or a risk score based on the confidence of the object match.

After the image is created, at 1107, post processing on the NPSD image is performed (if desired). Post processing can be performed, for example, for the purpose of enhancing image resolution or enhancing image contrast, or for providing annotation for the image. At 1108, the combined image is sent to a device, which can include a handheld user device, a body mounted user device, or any other device that can receive data and render an image of the data, including a device at a central management system.

For any appropriate devices equipped with a display, detected objects are presented on an overlay or superimposition of a visual image of the target in the areas on the target where they were detected. For the purposes of the present invention, the terms "overlay" and "superimposition" are used interchangeably.

In an embodiment, tapping on the display screen showing the superimposed image causes the display to present a zoomed (magnified) view of the selected objected. A second tap causes the zoomed image to disappear. This can be repeated for any object, or for any point on the display.

The data can include position information such as the GPS coordinates of the originating NPSD device or a representation on a map of the first NPSD, other users, the first user, other NPSDs the target, and the first user. In an embodiment, such data can include specific GPS coordinates and other information such as user or officer identification.

In addition, NPSD or drone status can be sent to other users or authorized receivers detailing the status of the device, such as whether it is in active or standby mode, or whether the NPSD has experienced extreme acceleration such as drop event or where the user could be in an altercation, or where the NPSD could be damaged. Other sent data can include information as deemed necessary. In an embodiment, the system is programmable to send any kind of data acquired and deemed to be relevant, and can be implemented in the policy framework.

While certain embodiments have been shown and described above, various changes in form and details may be made. For example, some features of embodiments that have been described in relation to a particular embodiment or process can be useful in other embodiments. Some embodiments that have been described in relation to a software implementation can be implemented as digital or analog hardware. Furthermore, it should be understood that the systems and methods described herein can include various combinations and/or sub-combinations of the components and/or features of the different embodiments described. For example, types of data or components described in relation to certain processes can be applicable in other contexts. Thus, features described with reference to one or more embodiments can be combined with other embodiments described herein.

Although specific advantages have been enumerated above, various embodiments may include some, none, or all of the enumerated advantages. Other technical advantages may become readily apparent to one of ordinary skill in the art after review of the following figures and description.

It should be understood at the outset that, although exemplary embodiments are illustrated in the figures and described above, the present disclosure should in no way be limited to the exemplary implementations and techniques illustrated in the drawings and described herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

We claim:

1. A method comprising:
   performing, by a first coherent radar system on a chip configured to operate in a terahertz range between 0.1 THz and 1 THZ, a first radar scan of a target, the first coherent radar system being in physical contact with a first non-physical scanning device;
   receiving, at the first non-physical scanning device, first scanning data from the first radar scan;
   sending a coordination signal to a second non-physical scanning device;
   performing, by a second coherent radar system on a chip configured to operate in the terahertz range between 0.1 THz and 1 THz, a second radar scan of the target, the second coherent radar system being in physical contact with the second non-physical scanning device;
   receiving, at the second non-physical scanning device, second scanning data from the second radar scan;
   sending the first and second scanning data to a processor for a determination as to whether an impermissible object has been detected.

2. The method of claim 1, wherein the processor is in physical contact with at least one of the first and second non-physical scanning devices.

3. The method of claim 1, where the processor is in physical contact with neither the first nor the second non-physical scanning devices.

4. The method of claim 1, further comprising:
rendering an image based on the first and second scanning data.

5. The method of claim 1, further comprising:
receiving, at the first non-physical scanning device, instructions to move the first non-physical scanning device to a first desired location.

6. The method of claim 5, wherein the coordination signal includes at least one of:
instructions to move the second non-physical scanning device to a position relative to the first non-physical scanning device, or
visual images of the target, or
instructions to scan the target.

7. The method of claim 6, further comprising:
sending, to the processor, an image of a region for scanning;
selecting the target based on at least one of the visual images.

8. A method comprising:
receiving, at a first non-physical scanning device, a signal to move to a first position that satisfies a position policy;
selecting a target;
scanning, by a first coherent radar system on a chip in physical contact with the first non-physical scanning device and configured to operate in a terahertz range between 0.1 THz and 1 THZ, a first radar scan of a target;
receiving, at the second non-physical scanning device, instructions to move to a second position, the second position being related to the first position;
scanning by a second coherent radar system on a chip in physical contact with the second non-physical scanning device and configured to operate in the terahertz range between 0.1 THz and 1 THz, a second radar scan of a target;
sending to a processor a first data set from the first coherent radar system on a chip;
sending to the processor a second data set from the second coherent radar system on a chip;
determining, at the processor, based on the first data set and second data set, whether an impermissible object has been scanned.

9. The method of claim 8, wherein the selecting a target is performed on a processor in physical contact with at least one of the first non-physical scanning device and the second non-physical scanning device.

10. The method of claim 9, further comprising:
if an impermissible object has been scanned, rendering, based on the first data set and the second data set, a visual representation of the target and the impermissible object, coherent radar system on a chip.

11. The method of claim 9, wherein the rendered visual representation includes a first visual representation based on the first data set and a second visual representation based on the second data set, the first visual representation being rendered adjacent to the second visual representation.

12. The method of claim 11, wherein the determining is performed at a handheld control device proximate to the target.

13. The method of claim 9, where the determining is performed at a central command center.

14. The method of claim 8, wherein the selecting a target is performed on a processor in physical contact with a non-physical scanning device.

15. The method of claim 8, wherein the sending the first data set and second data set occurs over a wireless network.

* * * * *